United States Patent [19]
Kumasawa et al.

[11] Patent Number: 6,009,498
[45] Date of Patent: Dec. 28, 1999

[54] DISK CONTROL UNIT FOR HOLDING TRACK DATA IN CACHE MEMORY

[75] Inventors: Tadashi Kumasawa; Hidehisa Takahashi, both of Kawasaki, Japan

[73] Assignee: Fujitsu Limited, Kawasaki, Japan

[21] Appl. No.: 08/548,429

[22] Filed: Oct. 26, 1995

[30] Foreign Application Priority Data

| | | | |
|---|---|---|---|
| Feb. 16, 1995 | [JP] | Japan | 7-027794 |
| Apr. 20, 1995 | [JP] | Japan | 7-095067 |

[51] Int. Cl.⁶ .................................................. G06F 12/16
[52] U.S. Cl. .................................... 711/113; 711/3; 711/4;
711/111; 711/112; 711/114; 711/118; 711/161;
711/162; 711/205; 711/207; 711/208; 711/216;
714/6; 714/15; 714/18; 714/21; 371/40.11;
371/40.2; 371/40.14; 371/40.15; 365/49;
365/50; 360/48
[58] Field of Search .................................. 395/439–441,
395/402, 404, 182.04, 182.13, 182.16, 182.19;
360/48; 365/49–50; 711/111–114, 3, 4,
161–162, 216, 205, 207–208, 118; 371/40.11,
40.2, 40.14, 40.15; 714/6, 15, 18, 21

[56] References Cited

U.S. PATENT DOCUMENTS

| | | | |
|---|---|---|---|
| 4,603,380 | 7/1986 | Easton et al. | 395/440 |
| 4,875,155 | 10/1989 | Iskiyan et al. | 395/440 |
| 5,132,853 | 7/1992 | Kulakonskie et al. | 366/48 |
| 5,146,580 | 9/1992 | Naidu et al. | 395/402 |
| 5,193,184 | 3/1993 | Belsam et al. | 305/404 |
| 5,392,445 | 2/1995 | Takamoto | 395/800 |
| 5,421,003 | 5/1995 | Escola et al. | 395/182.14 |
| 5,535,372 | 7/1996 | Benhase et al. | 395/500 |
| 5,590,298 | 12/1996 | Kawamoto | 711/3 |
| 5,613,066 | 3/1997 | Matsushima et al. | 305/185.02 |
| 5,724,542 | 3/1998 | Taroda et al. | 711/113 |
| 5,732,408 | 3/1998 | Takahashi et al. | 711/113 |

FOREIGN PATENT DOCUMENTS

| | | |
|---|---|---|
| 60-015760 | 1/1985 | Japan . |
| 63-148349 | 6/1988 | Japan . |
| 04123242 | 4/1992 | Japan . |
| 06180671 | 6/1994 | Japan . |
| 59-125463 | 7/1994 | Japan . |

*Primary Examiner*—John W. Cabeca
*Assistant Examiner*—Denise Tran
*Attorney, Agent, or Firm*—Greer, Burns & Crain, Ltd.

[57] ABSTRACT

A cache memory holds data of a disk unit on a track unit basis. Recording format information of the track in each disk unit is held in an LTD. For a write request from an upper apparatus, in case of a hit of the cache memory, a write cache control unit finishes a writing process on the cache memory and reports an end of process to the upper apparatus. In case of a mishit of the cache memory, a recording format is analyzed with reference to the LTD and a record position on the track to be developed in the cache memory is recognized, the writing process is finished on the cache memory and an end of process is reported to the upper apparatus.

17 Claims, 29 Drawing Sheets

| TRACK ADDRESS | FLAG | RECORD NO. | RECORD LENGTH | THE NUMBER OF RECORDS | CCHH |
|---|---|---|---|---|---|
| 0 0 | FL0 | R1 | 8 SECTORS | 1 2 8 | 0 0 0 0 |
| 0 1 | FL1 | R1 | 8 SECTORS | 1 0 0 | 0 1 0 0 |
| 0 2 | FL2 | R6 | 8 SECTORS | 7 5 | 0 2 0 0 |
| 0 3 | FL3 | R1 | 8 SECTORS | 1 2 8 | 0 3 0 0 |

FIG. 9

| DEFECTIVE TRACK ADDRESS | ALTERNATING TRACK ADDRESS |
|---|---|
| 0 1 0 0 | 1 0 0 0 |
| 0 2 5 0 | 1 0 0 1 |
|  | 1 0 0 2 |
|  | 1 0 0 3 |

DISK CONTROL UNIT FOR HOLDING TRACK DATA IN CACHE MEMORY

BACKGROUND OF THE INVENTION

The present invention relates to a disk control unit for writing and reading data to/from a disk apparatus having a data format of a variable length on the basis of an input/output request of an upper apparatus and, more particularly, to a disk control unit for holding data in a cache memory on a track unit basis, thereby promptly coping with an access from the upper apparatus.

In recent years, in a magnetic disk subsystem which is used for an external storage of a computer system, it is indispensable to use a cache technique in a disk control unit to which a plurality of magnetic disk units are connected as physical devices under the domination of the disk control unit. Such a cache function of the disk control unit is known as a disk cache. In association with an access of a large quantity of data, there have been proposed various methods such as increase in capacity of the cache memory, formation of a non-volatile cache memory in order to guarantee the holding of data when a power supply is shut off, and the like. Among them, an attention is paid to a technique such that data of a disk unit is held in the cache memory on a track unit basis, a staging process of the data from the disk unit to the cache memory is not used as a prerequisite, and even if the cache memory causes a mishit due to a writing process, and the data from a host computer is stored into the cache memory and input/output processes are finished without needing an access to the disk unit, thereby enabling an input/output processing time to be reduced. Such a function in which all of the processes until the end of the input and output are finished on the cache memory by holding the data in the cache memory on a track unit basis largely contributes to reduce an executing time in case of performing processes such as formation, updating, and working of a work data set on the disk unit.

As for a cache control in which a data management on the cache memory is performed on a track unit basis of a disk unit, in a magnetic disk subsystem for storing data into the disk unit as a block of a fixed length, since a recording format of the disk unit has fixedly been determined, a record management of the track unit can be relatively easily realized on the cache memory. However, in a subsystem using a disk unit of a CKD format to store data of a variable length, since the number of records of each track is variable and the data can be formatted on a track unit basis, there is also a possibility such that recording formats on the cache and the disk differ. If the input/output processes are finished on the cache memory without confirming the recording format of the disk unit, there are various problems. For example, although the input/output processes are executed by a one-sided instruction of a host computer, there is often a mistake in recognition of an input/output processing software, so that there is a situation such that a record of a format different from the recording format on the disk unit is written. Such a difference between the recording formats of the input/output processing software and the disk unit occurs due to an error that is caused by a bug of the input/output processing software. In addition to such an error, however, there is also a case where the input/output processing software purposely changes the last recording format, thereby abnormally finishing.

For such a difference of the recording formats, hitherto, since the disk unit is accessed and data is written while confirming a data length and the like of the record, a process can be refused for those mistakes. However, in the cache control such that the end of the input/output process is notified to the host computer at a time point when the write data to the record has been written into the cache memory, there occurs a problem such that even if the recording format of the disk unit differs from the recording format written into the cache memory, such a fact cannot be recognized and a failure of the processes cannot be reported. As another example, in a reading or searching process of the disk unit, since data has an uncertain length, unless the records of the track are sequentially read out, it is impossible to access to a target track, and the processes on the cache memory cannot be finished.

SUMMARY OF THE INVENTION

According to the invention, there is provided a disk control unit in which data is held in a cache memory on a track unit basis with respect to a disk unit of a CKD format in which variable length data has been stored. A recording format of the track, namely, a track format, is recognized without accessing to the disk unit, and input/output processes can be finished only on the cache memory side.

First, the invention is made, as a target, for a disk control unit for writing and reading data to/from a disk unit having a data format (CKD format) of a variable length on the basis of an input/output request of an upper apparatus. The disk control unit has: a cache memory; a recording format information table; a write cache control unit; and a read cache control unit. Since the recording format information table is realized as a (Look-a-side Table Directory), the recording format information table of the track is simply referred to as an LTD in the following description. The cache memory holds the data of the disk unit on a track unit basis. Recording format information of the track in each disk unit is held in the LTD. For a write request from the upper apparatus, when corresponding track data exists on the cache memory (at the time of a hit), the write cache control unit finishes a writing process on the cache memory and reports the end of process to the upper apparatus. When the corresponding track data doesn't exist on the cache memory (at the time of a mishit), the write cache control unit analyzes the recording format by referring to the LTD, recognizes a record portion on the track to be developed in the cache memory, finishes the writing process on the cache memory, and reports the end of process to the upper apparatus. For a read request from the upper apparatus, when corresponding track data exists on the cache memory (at the time of a hit), the read cache control unit transfers the data on the cache memory to the upper apparatus and finishes the process. When the corresponding track data doesn't exist on the cache memory (at the time of a mishit), the read cache control unit stages the corresponding track from the disk unit, transfers the data to the upper apparatus after that, and finishes a reading process. The LTD holds a data length of an R0 record on the track as recording format information. When a format write command to change the recording format after an R1 record subsequent to the R0 record of the track data is received from the upper apparatus, the write cache control unit recognizes a start position of the R1 record from the data length of the R0 record in the LTD and can change the recording format on the cache memory. The LTD holds the number of records existing on the track as recording format information. Therefore, for the write request by the designation of the record number of from the upper apparatus, the write cache control unit can discriminate whether the designated record exists on the track or not with reference to the number of records in the LTD. As recording format information, the LTD holds an equal length flag indicating that all of the records on the track have the same data length. Therefore, for the write request by the designation of the record number from the upper apparatus, the write cache control unit can calculate the position (address) of the designated record on the cache memory from the equal length flag and the record length and can write. Further, a defective alternating track correspondence table indicative of the correspondence between the defective track and the alternating track is provided for the disk control unit. In this case, as recording format information, the LTD holds a defective track flag to recognize a defective track. When the defective track flag is recognized for the write request from the upper apparatus, the write cache control unit writes to the alternating track on the cache memory with reference to a defective alternating track correspondence table. As a cache memory, a non-volatile cache memory which can hold data when the power supply is shut off is provided and the LTD is stored in the non-volatile cache memory. Thus, the contents in the table of the LTD can be continuously held for the on/off operations of the power supply of the apparatus. The disk unit has an exclusive-use area for storing the contents of the LTD on a disk medium. Consequently, even if there is a rearrangement of the disk units or a movement of the disk units among the systems, the contents of the LTD can be effectively used. Further, the disk control unit has: a table writeback unit to write the contents of the LTD into the corresponding disk unit when the power supply is shut off; and an LTD forming unit for reading out the recording format information from the disk unit and storing into an LTD memory area on the cache memory when the power supply is turned on. Further, a career management table is provided for the disk control unit. Table invalid information indicative of non-connection, non-use, or the like and table valid information indicating that the table can be effectively used are stored in the career management table with respect to device Nos. #1 to #256 of a plurality of disk units which can be installed. The table forming unit sequentially keeps memory areas of the LTD onto the cache memory in accordance with the order of the device Nos. #1 to #6 of the disk units with reference to the career management table when the power supply is turned on. In this instance, when the LTD valid information is recognized, the LTD memory area is assured. When the LTD invalid information is recognized, the LTD memory area is not assured but is used as a cache data area.

In the case where the non-volatile cache memory which can hold data at the time of the shut-off of the power supply is provided as a cache memory, the career management table is stored in the non-volatile cache memory. In the case where the career management table is provided for the magnetic disk control unit, when the power supply is turned on, the table forming unit sequentially refers to the career management table in accordance with the device Nos. #1 to #6 of the disk units. When the LTD valid information is recognized, the recording format information of the corresponding disk unit is read. When the LTD invalid information is recognized, the reading of the recording format information of the corresponding disk unit is inhibited. The table writeback unit periodically writes back the contents of the LTD to the corresponding disk unit.

In the case where the write cache control unit changes the recording format requested from the upper apparatus on the cache memory and updates the recording format information of the corresponding LTD, the table writeback unit writes back the recording format information to the corresponding disk unit when the end of changing process of the recording format by the write cache control unit is recognized. When the recording format is changed, the write cache control unit sets the LTD invalid information into the career management table. In this case, when the power supply is shut off, the LTD writeback unit writes back only the LTD having the table invalid information to the corresponding disk unit with reference to the career management table. Since the recording format of the LTD valid flag on the cache coincides with that on the disk, there is no need to write back the recording format information.

As recording format information, the LTD further has flag information indicating whether the recording format information is valid or invalid. During the operation of the apparatus, the LTD forming unit forms the recording format information and stores into the LTD with respect to the track in which the flag information of the LTD indicates "invalid". For instance, when a format writing operation to initialize the recording format is executed in the write cache control unit from the upper apparatus and the records of one track are formed in the cache memory, the LTD forming unit forms the corresponding recording format information and stores into the LTD. The LTD forming unit periodically searches the track in which the flag information of the LTD is invalid, reads out the track data from the disk unit, analyzes the track data, and forms the recording format information. Further, at the time of staging of the track data from the disk unit by the read cache control unit, when it is recognized that the flag information of the LTD is invalid, the LTD forming unit analyzes the staged track data and forms the recording format information. Further, in the case where a disk unit is newly extended and can be used, the LTD forming unit assures the memory area of the LTD of the extended disk unit onto the cache memory. At the same time, by periodically reading out and analyzing all of the track data of the extended disk unit, the LTD forming unit forms the recording format information and stores into the LTD. For the read request from the upper apparatus, when the corresponding data doesn't exist in the cache memory, the read cache control unit refers to the LTD and, when the staging of a plurality of track data for a plurality of disk units is recognized, the read cache control unit instructs the plurality of disk unit to execute the reading operation in parallel, thereby simultaneously staging a plurality of tracks.

Further, a format identification (ID) flag indicating whether the track data of the disk unit has a standard format in which it has been formatted and written on the cache memory or not is provided in the LTD. When a space area in the cache memory is changed to the standard format by a format write command from the upper apparatus, the write cache control unit refers to the format ID flag of the LTD and instructs a schedule to write back the track data to the disk in case of the standard format and instructs an inhibition of a schedule to write back the track data to the disk when the recording format is not the standard format. The standard format is a standard CKD format of a variable length record. The write cache control unit executes a format writing operation when either one of the following conditions is discriminated by decoding the write command of the upper apparatus.

Condition 1: Writing of a home address HA

Condition 2: Writing of the R0 record

Condition 3: Search of the R0 record and the format write command is chained

In the case where the upper apparatus is based on the command system of the CKD standard format of the variable length record and the cache memory and the disk unit have a standard FBA format of the fixed length record, the write cache control unit converts the track data of the standard CKD format from the upper apparatus into the standard FBA format of the fixed length record and formats and writes the cache memory by the standard FBA format when either one of the following conditions is discriminated by decoding the write command before conversion.

Condition 1: Writing of the home address HA

Condition 2: Writing of the R0 record

Condition 3: Search of the R0 record and format write command is chained

According to the disk control unit of the invention as mentioned above, even in the disk unit having the recording format of the variable length or even if a mishit occurs for the write request from the upper apparatus, by referring to the LTD, the recording format in the actual disk unit is recognized, the data is written into the designated record on the cache memory in accordance with the recognized recording format, and the completion of the process can be reported to the upper apparatus. When sweeping out the data from the cache memory in accordance with an LRU, the data of the track in which the writing process is finished on the cache memory is written into the disk unit by the writeback process. However, since their recording formats coincide, the data can be normally written back without causing an error due to the difference of the recording formats. On the other hand, even when there is a write request different from the recording format of the disk unit from the upper apparatus, the difference between the recording format of the write request and the recording format of the disk unit can be recognized with reference to the LTD. In this case, since the data cannot be written back later, a failure of the process due to the difference of the recording formats can be reported to the upper apparatus.

The above and other objects, features, and advantages of the present invention will become more apparent from the following detailed description with reference to the drawings.

BRIEF DESCRIPTION OF THE DRAWINGS

FIG. 9 is an explanatory diagram of a defective alternating track correspondence table;

FIG. 18 is a flowchart for an initial forming process of the LTD when a power supply is turned on;

DETAILED DESCRIPTION OF THE PREFERRED EMBODIMENTS

[Operation environment]

Figure 1:
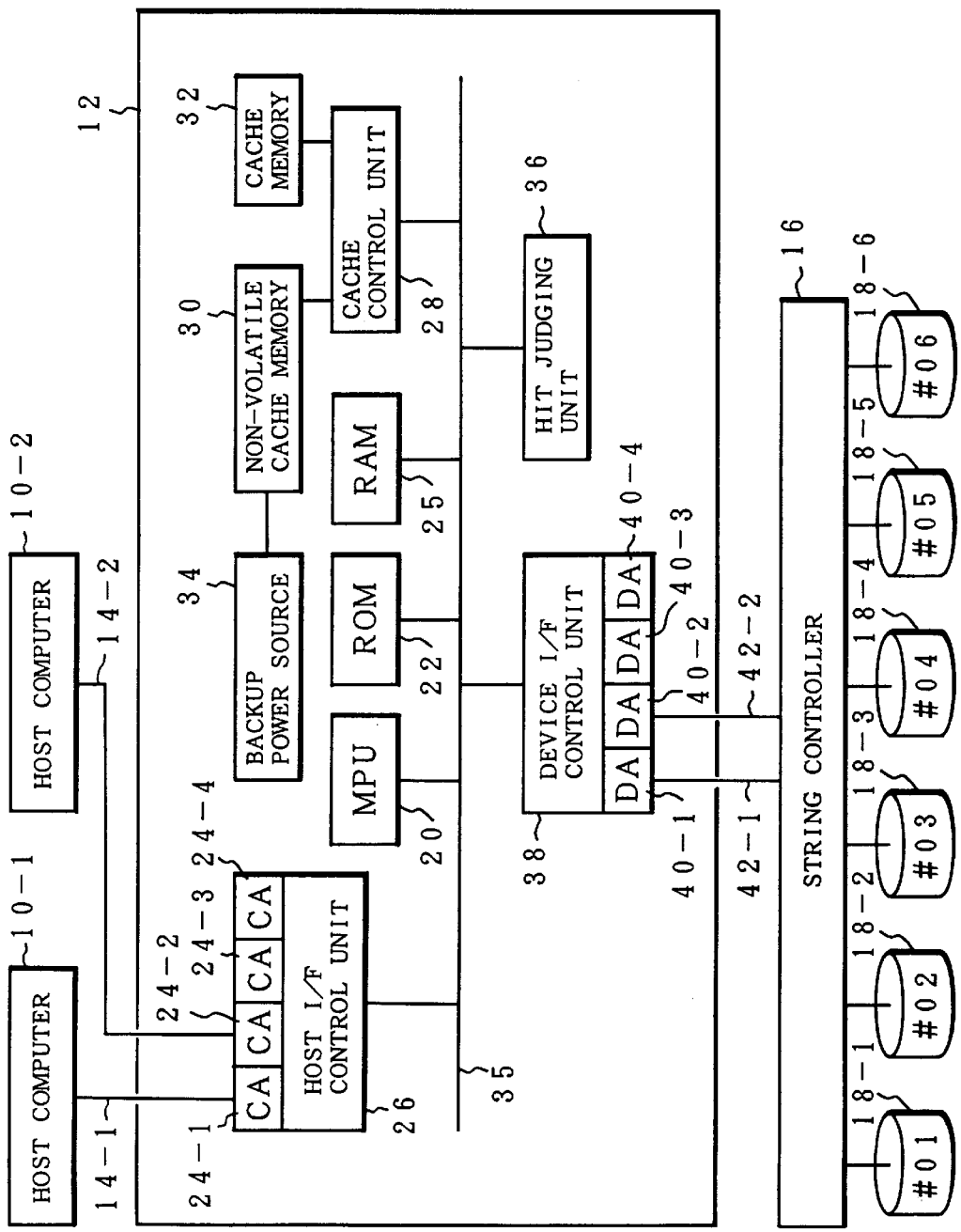
FIG. 1 is a block diagram of an embodiment of the invention.

FIG. 1 shows a construction of a magnetic disk subsystem to which the present invention is applied. In the embodiment, a disk control unit 12 is provided for two host computers 10-1 and 10-2. Six disk units 18-1 to 18-6 are connected through a string controller 16 under the domination of the disk control unit 12. The disk units 18-1 to 18-6 have device Nos. #01 to #06. An MPU 20 is provided for the disk control unit 12. A ROM 22, a RAM 25, a host interface control unit 26, a cache control unit 28, a hit judging unit 36, and a device interface control unit 38 are connected to the MPU 20 through an internal bus 35. In the embodiment, four channel adapters (CA) 24-1 to 24-4 are provided for the host interface control unit 26. Among them, the channel adapter 24-1 is connected to the host computer 10-1 by a channel bus 14-1. The channel adapter 24-2 is connected to the host computer 10-2 by a channel bus 14-2. Four device adapters 40-1 to 40-4 are provided for the device interface control unit 38. Among them, the device adapters 40-1 and 40-2 are connected to the string controller 16 through device buses 42-1 and 42-2. A non-volatile cache memory 30 and a cache memory 32 are provided for the cache control unit 28. A backup power source 34 is connected to the non-volatile cache memory 30. Even if a power supply of the apparatus is shut off, the memory 30 can hold data by supplying a power source from the backup power source 34. On the other hand, a backup power source is not provided for the cache memory 32, so that the cache memory 32 is a volatile memory in which data is deleted when the power source of the apparatus is shut off. The cache control unit 28 executes a cache control for input/output requests from host computers 10-1 and 10-2 while communicating with the hit judging unit 36.

Figure 2:
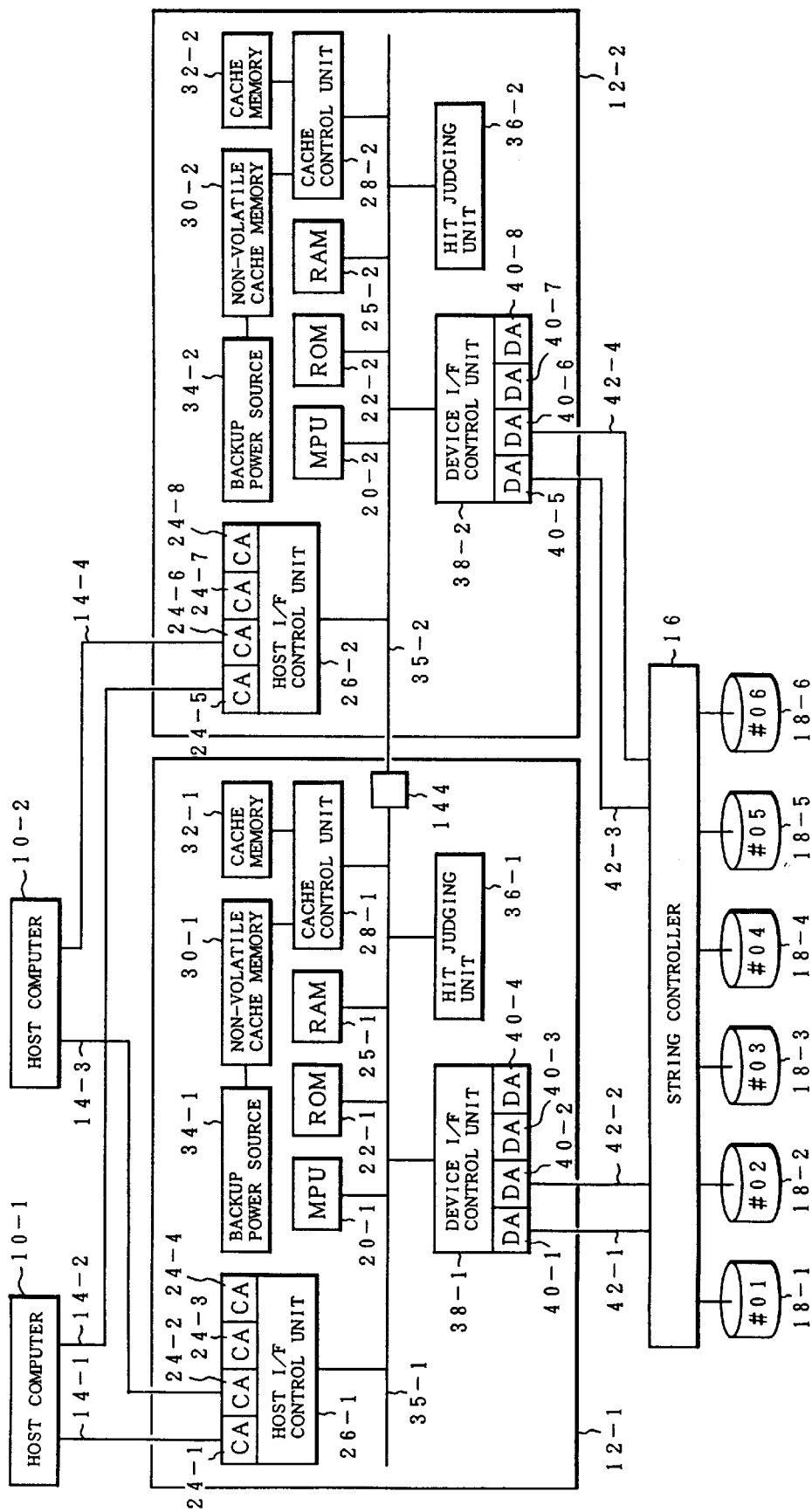
FIG. 2 is a block diagram of an embodiment of the invention with a double construction.

FIG. 2 shows another embodiment of an operation environment to which the invention is applied. The embodiment is characterized in that two systems of the disk control unit 12 of FIG. 1 are provided, thereby forming a double construction. Disk control units 12-1 and 12-2 having the same construction are provided for the host computers 10-1 and 10-2. The six disk units 18-1 to 18-6 are commonly connected to the disk control units 12-1 and 12-2 through the string controller 16 under the domination of the disk control units. The disk control units 12-1 and 12-2 are substantially the same as the disk control unit 12 in FIG. 1. Each circuit unit of the disk control units 12-1 and 12-2 is designated by adding reference numerals "-1" or "-2" after the same reference numeral. Internal buses 35-1 and 35-2 of the disk control units 12-1 and 12-2 are connected through a bridge circuit 144, so that instructions and data can be transmitted and received between MPUs 20-1 and 20-2. In such a double construction, it is a fundamental concept that the two disk control units individually operate for input/output requests from the host computers 10-1 and 10-2, respectively. A different point is that when the data on the cache is updated by one disk control unit, the updated data is copied to the other disk control unit in order to guarantee that the cache data of the two disk control units are identical.

[Functional construction of disk control unit]

Figure 3:
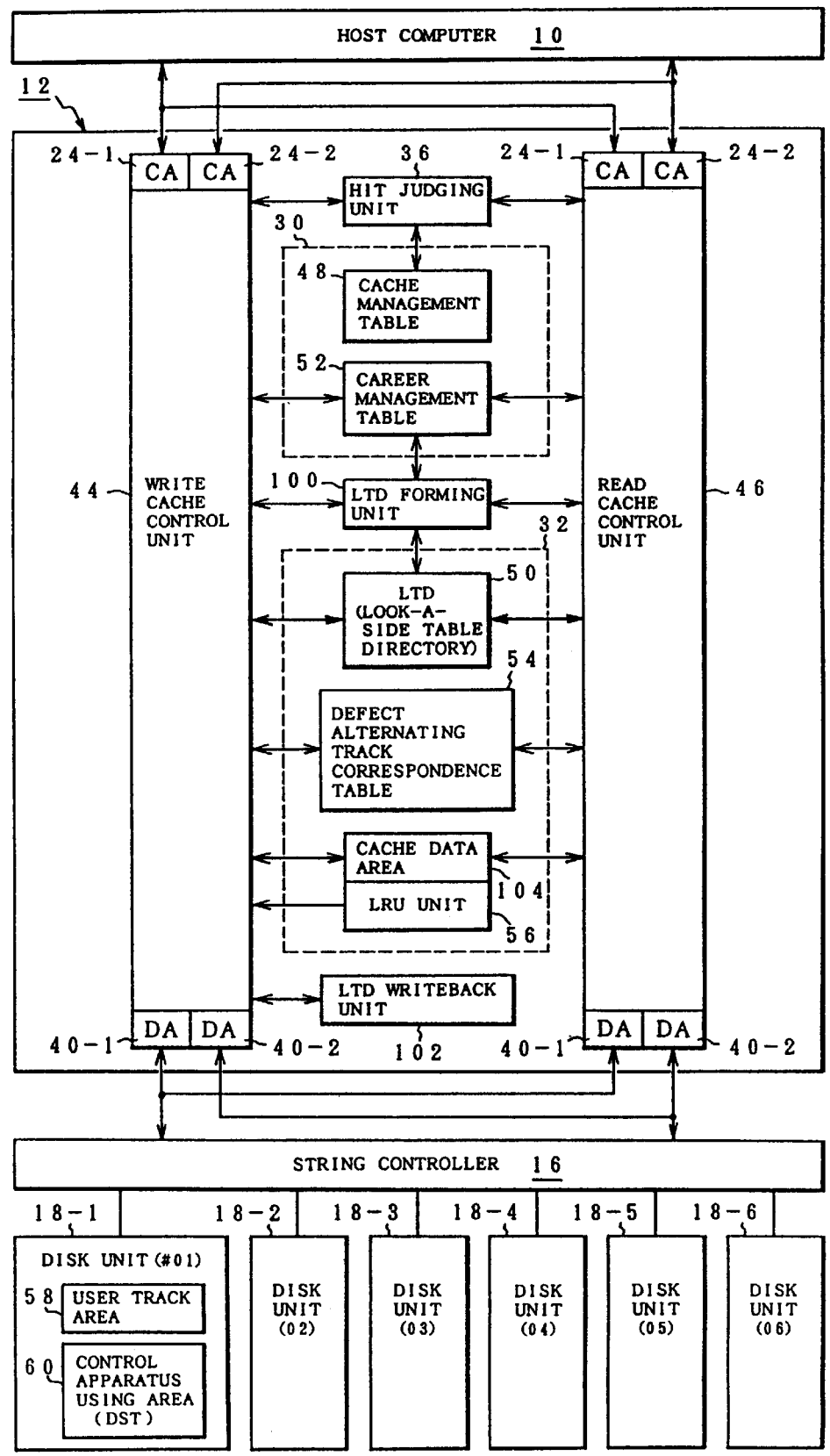
FIG. 3 is a block diagram showing functions of the invention.

FIG. 3 shows functions of the disk control unit 12 of the invention. First, a write cache control unit 44 and a read cache control unit 46 are provided as a fundamental control unit for a cache control for the disk control unit 12. For the cache control by the write cache control unit 44 and read cache control unit 46, the hit judging unit 36, a cache management table 48, a cache data area 104, and an LRU unit 56 are provided. Among them, the cache management table 48 is stored into the non-volatile cache memory 30. The cache data area 104 and LRU unit 56 are developed in the volatile cache memory 32. Data of the disk units 18-1 to 18-6 connected under the domination of the string controller 16 has been stored in the cache data area 104 on a track unit basis. Although a size of cache data is fundamentally the track unit, when a data length is short, there is also a case where the cache data is stored as partial track data having a size of ½ of the track size. Information necessary for the cache control using a track address as an entry has been stored in the cache management table 48.

In addition to such functions which are ordinarily necessary for the track control, according to the invention, an LTD (Look-a-side Table Directory) 50 is newly provided. Information regarding the recording format of each track has been stored in the LTD 50 every device Nos. #01 to #06 of the usable disk units 18-1 to 18-6 connected at present to the disk control unit 12. The LTD 50 is provided in the volatile cache memory 32. The LTD 50 can be also provided in the non-volatile cache memory 30. In case of providing the LTD 50 in the non-volatile cache memory 30, since the LTD can be continuously maintained in the disk control unit 12 irrespective of the on/off operations of the power supply, the initial formation by the writeback to the disk units 18-1 to 18-6 at the time of shut-off of the power supply and the reading-out from the disk units 18-1 to 18-6 at the time of turn-on of the power supply is unnecessary. In the following embodiment, explanation will now be made with respect to the case where the LTD 50 is provided in the volatile cache memory 32 as an example.

Further, a career management table 52 is newly provided in the invention. Memory areas of career information of the device numbers of the disk units as many as the maximum number of disk units which can be connected to the disk control unit 12, for example, the device Nos. #001 to #256 are prepared in the career management table 52. A part of the career management information memory area is used to store the management information of the LTD 50. Specifically speaking, pointer information indicative of the address head position of every device No. of the LTD 50 developed in the cache memory 32 and information indicating whether the LTD 50 developed in the cache memory 32 can be effectively used or not have been stored in the career management table 52 by using the device No. as an entry. Further, in the disk units 18-1 to 18-6, the defective track which cannot be used has been known at the time of the initial formatting. An alternating track is determined for the defective track. Therefore, a defective alternating track correspondence table 54 is developed in the cache memory 32. The contents in the defective alternating track correspondence table 54 can be also stored as one of the information of the LTD 50 instead of the independent table. Further, an LTD forming unit 100 to form the LTD 50 onto the cache memory 32 is provided. The LTD forming unit 100 executes an initial formation of the LTD 50 at the time of the turn-on of the power supply of the apparatus and a intermediate formation of recording format information in an invalid state during the operation of the apparatus. In the initial formation at the time of the turn-on of the power supply, the LTD forming unit 100 assures six LTD memory areas corresponding to the device Nos. #01 to #06 of the disk units 18-1 to 18-6 which can be used at present by using the address head position designated by the table pointer on the cache memory 32 as a reference by referring to the career management table 52. Subsequently, the record format information which was written back at the time of shut-off of the power supply is read out and developed in the disk units 18-1 to 18-6. Therefore, as representatively shown in the disk unit 18-1, a control apparatus using area 60 which can be accessed by only the disk unit 12 other than a user track area 58 is provided in each of the disk units 18-1 to 18-6. The control apparatus using area 60 is ordinarily called a device support track (DST). When the power supply of the apparatus is shut off, the recording format information of the corresponding LTD 50 in the cache memory 32 is stored in the control apparatus using area 60. When the power supply of the apparatus is turned on, the recording format information of the control apparatus using area 60 is read out. The corresponding LTD 50 is developed on the cache memory 32. Fundamentally, an LTD writeback unit 102 writes back the contents of the LTD 50 into the control apparatus using area 60 in the corresponding one of the disk units 18-1 to 18-6 when the power supply of the apparatus is shut off. When the LTD is written back at the time of the shut-off of the power supply, the recording format information can be physically moved integratedly with the disk units 18-1 to 18-6. For example, in the case where the disk unit is replaced or exchanged to the disk control unit of another system, the track format information used in the present disk control unit can be directly used as valid information in the disk control unit of another system. As for the writeback of the LTD during the operation of the apparatus, the latest track format information is always stored in the control apparatus using area 60 of the disk unit, so that the reliability of the recording format data in the case where the table cannot be written back due to the disconnection of the power supply or the like can be guaranteed.

Figure 4:
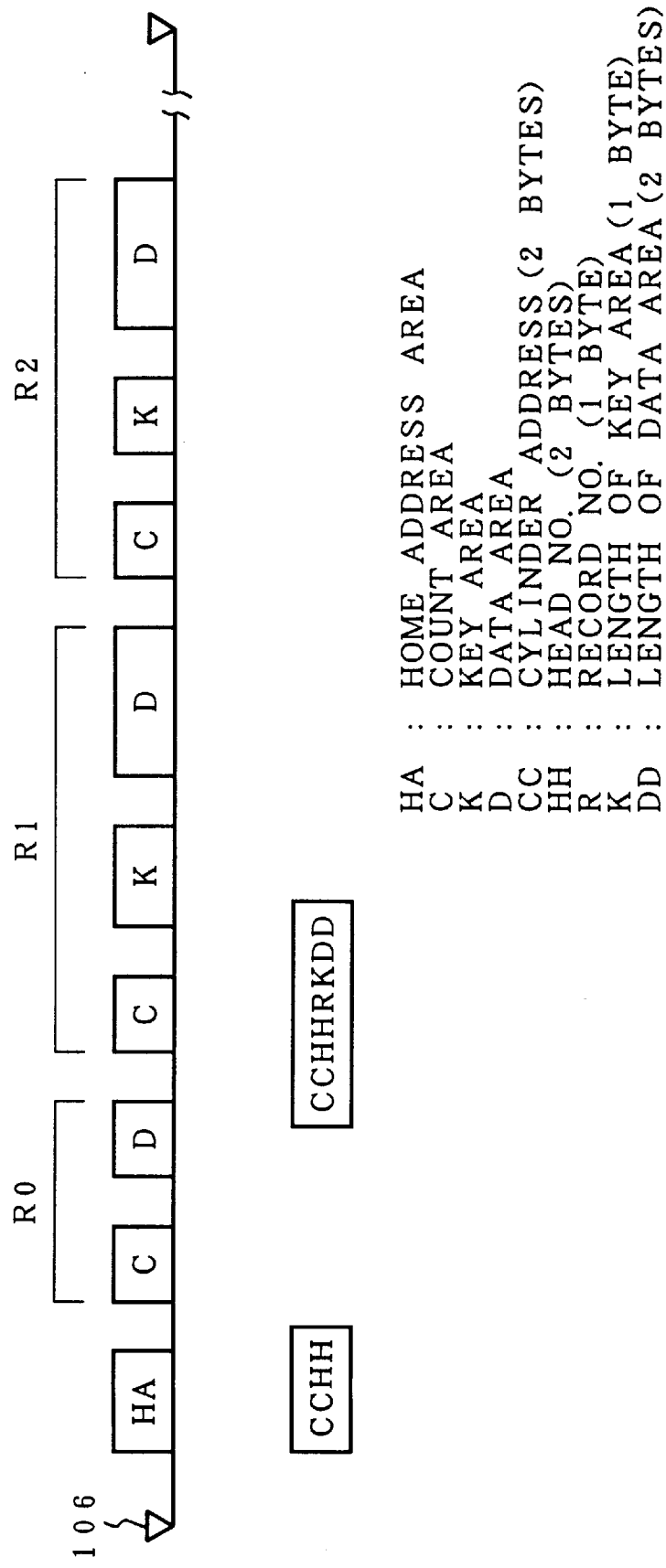
FIG. 4 is an explanatory diagram of a track structure according to a CKD format.

FIG. 4 shows a track structure of a CKD format as a recording format of the variable length of the disk units 18-1 to 18-6 in FIG. 3. Namely, in FIG. 4, a concentrical track is shown as a straight line and an interval between indices 106 is equal to a data length of one track. Several areas partitioned by gaps exist on the track. First, a home address area (HA) is provided at the head and a track address is described by a cylinder address CC of two bytes and a head number HH of two bytes. A record R0 to be used by an upper system program is provided after the home address area HA. The record R0 doesn't have a key area but is a record of a special format in which, for example, eight bytes are constructed by a count area (C) and a data area (D). Subsequent to the record R0, a plurality of records R1, R2, . . . each serving as a user area constructed by the count area (C), key area (K), and data area (D) are written. A track address CCHH, a record number (R), a data length (K) of the subsequent key area (K), and a data length DD of the subsequent data area (D) are described in the count area (C) of the user record. Such a CKD format is characterized in that both of the key area (K) and data area (D) of each record have a variable length, thereby improving a using efficiency of the track and realizing a high accessing speed. As for an input/output request from the host computer, an access in which each record is designated can be performed by designating the track address and record number.

Figure 5:
FIG. 5 is an explanatory diagram of a cache management table.

FIG. 5 shows a construction of the cache management table 48 in FIG. 3. The cache management table 48 is constructed by a track address 62, an updating flag 64, a partial flag 66, and a start sector number 68.

Figure 6:
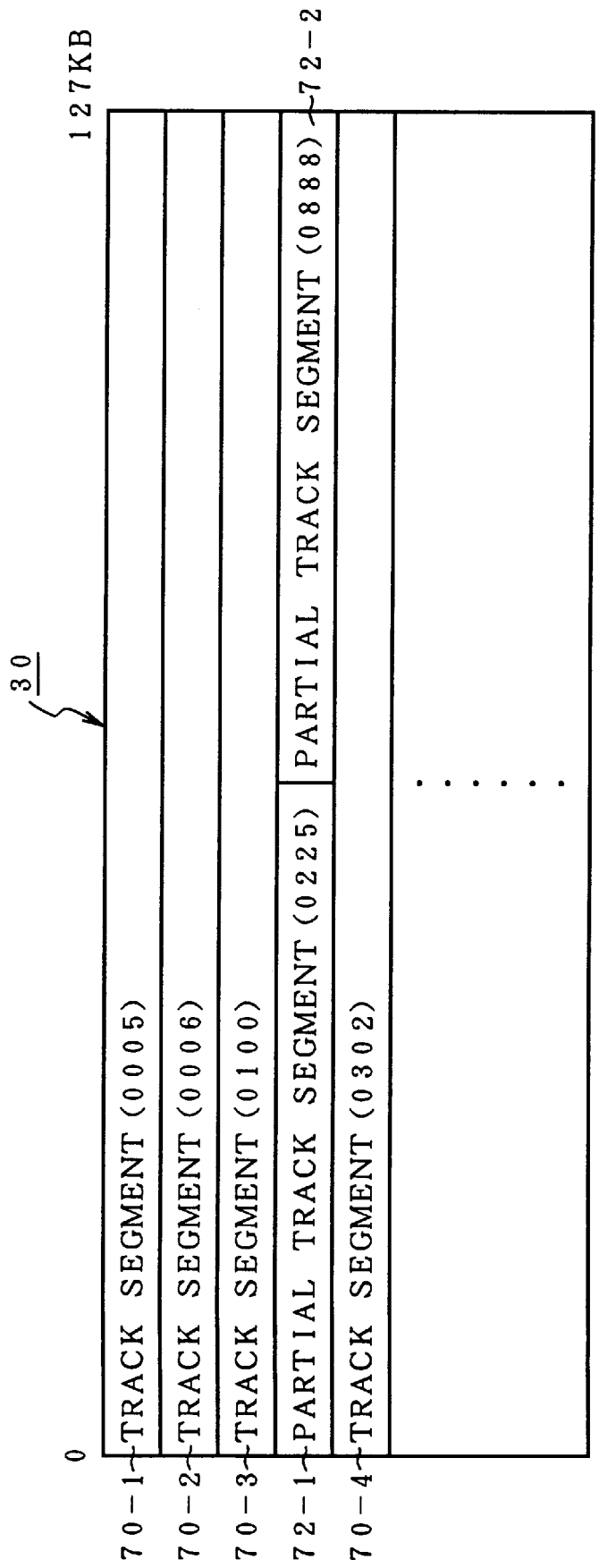
FIG. 6 is an explanatory diagram of a cache memory.

FIG. 6 shows a storage state of track data for the cache data area 104 in the cache memory 32. In the invention, the data of the CKD format is stored on a track unit basis. For example, when it is assumed that the minimum physical sector by the formatting of the disk unit consists of 1 kB and one track consists of 128 sectors, the data of the ordinary track unit on the cache memory 32 is stored as track segments of 128 kB like track segments 70-1 to 70-4. The track segments 70-1 to 70-4 are stored in correspondence to the track addresses in the cache management table 48 in FIG. 5. With respect to the track segments 70-1 to 70-4 each having a sector length of one track, as will be obviously understood from the track addresses, the partial flag 66 in the cache management table 48 is reset to 0. On the other hand, track addresses 0225 and 0888 indicate partial track segments 72-1 and 72-2 each having a length of 64 sectors (64 kB) of the half track. Therefore, in the cache management table 48, the corresponding partial flag 66 is set to 1, thereby indicating the partial track segment. In the partial track segments 72-1 and 72-2 of the track addresses 0225 and 0888 in which the partial flag is set to on, the next record number of the record R0 is not always equal to R1 and an arbitrary partial sector length can be cut out. Therefore, the sector number of the head record is stored in the start sector number 68. For instance, in the track address 0225, the head record is set to R64 and the partial data from the 64th sector of the half of the track is developed in the cache. The head record number of the track address 0888 is equal to R01 and this means that the partial data of 64 sectors from the head is developed.

Figure 7:
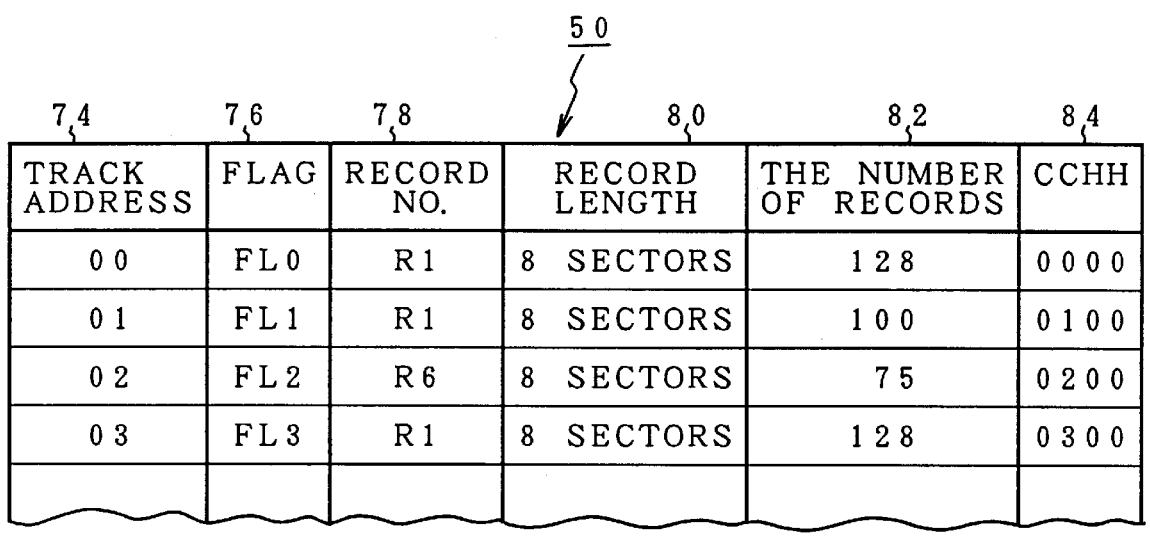
FIG. 7 is an explanatory diagram of an LTD.

FIG. 7 shows a construction of the LTD 50 which is used in the invention. The LTD 50 is constructed by a track address 74, a flag 76, a record number 78 of the head user record, a record length 80 of each record, and a cylinder address and a head address CCHH 84 written in the count area (C) after the R1 record.

Figure 8:
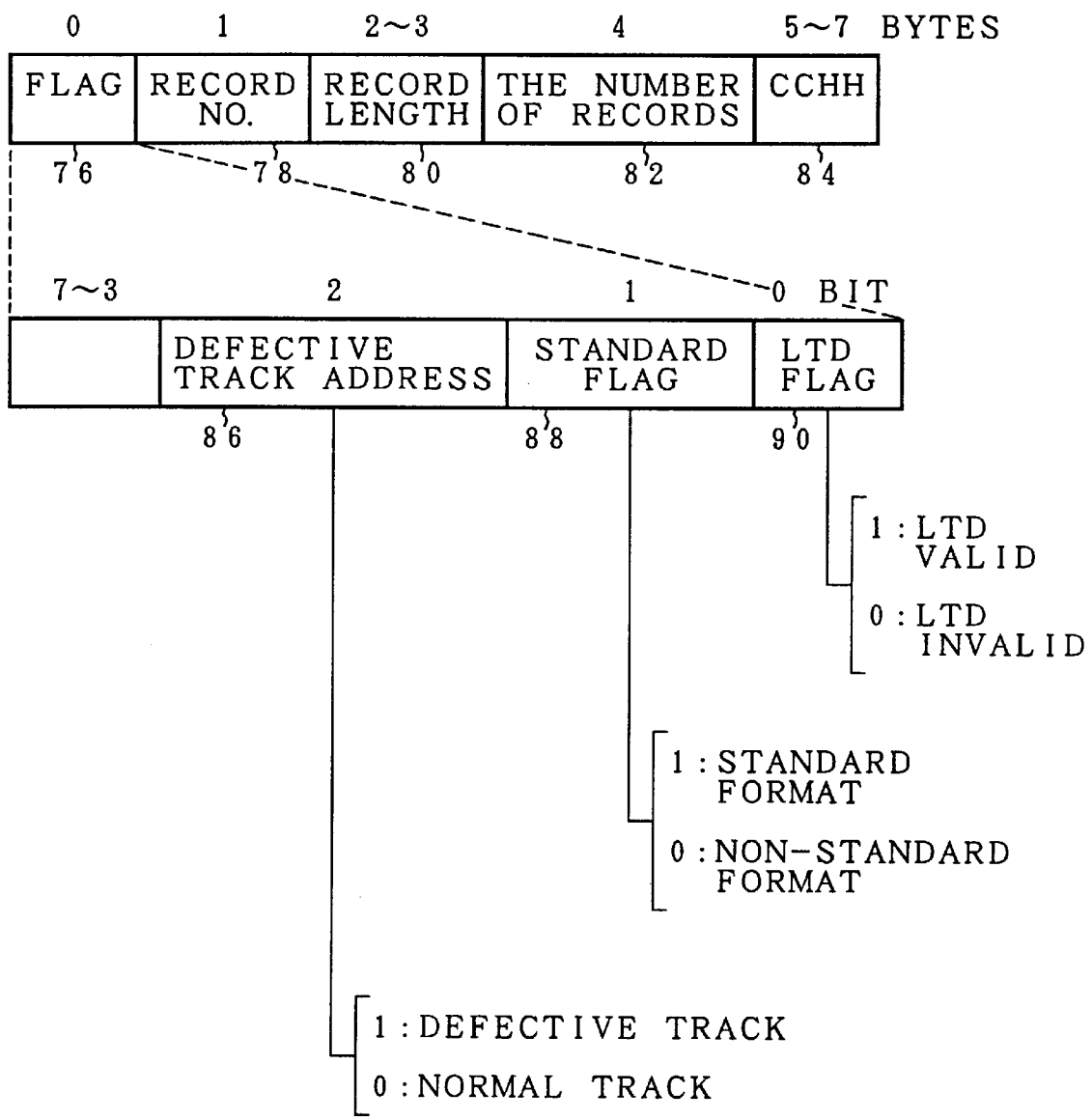
FIG. 8 is an explanatory diagram of a format of the LTD.

FIG. 8 shows the information of one track extracted from the recording format information of FIG. 7. The flag 76 consists of one byte. The record number 78 likewise consists of one byte. The record length 80 consists of two bytes. A record number 82 consists of one byte. CCHH 84 consists of three bytes. In this manner, the record has a format construction of total eight bytes. Further, the flag 76 is constructed by a defective track flag 86, a standard flag 88, and an LTD flag 90. When the defective track flag 86 is in a set state of 1, it indicates the defective track. When the flag 86 is in a reset state of 0, it indicates the normal track. When the defective track flag 86 is set to 1, the track is a defective track. By referring to the defective alternating track correspondence table 54 in FIG. 3 by the track address of the defective track, the track address of the alternating track is recognized and accessed. When the standard flag 88 is in a set state of 1, it indicates that the record has the CKD standard format. As shown in FIG. 4, the CKD standard format corresponds to the case of an equal length record in which a data length KL of the key area of the record R0 is equal to 0, there is no key area, the data (D) consists of eight bytes, and all of the record lengths of the records R1, R2, . . . are equal to, for instance, eight sectors. On the other hand, when the standard flag 88 is reset to 0, it indicates the non-standard format other than the CKD standard format. Further, when the LTD flag 90 is set to bit 1, it indicates that the recording format information is valid. When the LTD flag 90 is reset to bit 0, it indicates that the recording format information is invalid. When the LTD flag is set to 1 and the recording format information is valid, the access on the cache memory using the recording format information is performed. When the LTD flag 90 is reset to bit 0 and the recording format information is invalid, the access according to the recording format information is not executed.

FIG. 9 shows the defective alternating track correspondence table 54 in FIG. 3. The defective alternating track correspondence table 54 is constructed by a defective track address 92 and an alternating track address 94. A fact that the track is the defective alternating track can be recognized by checking that the defective track flag 86 in the flag 76 in FIG. 8 is set to bit 1 when referring to the LTD 50 in FIG. 7. In this instance, the corresponding alternating track address 94 is searched by using the defective track address 92 in the defective alternating track correspondence table 54 as an entry. It is possible to access to the searched alternating track address.

Figure 10:
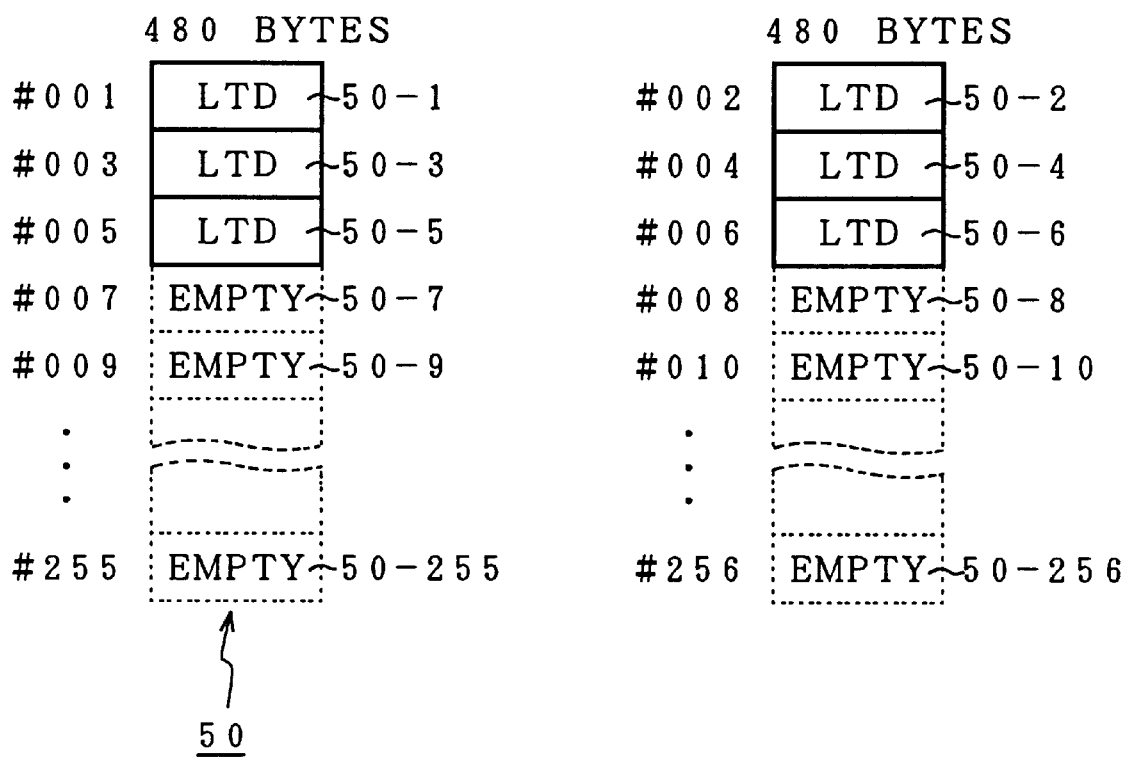
FIG. 10 is a developed explanatory diagram of a memory area of the LTD on the cache memory.
Figure 11:
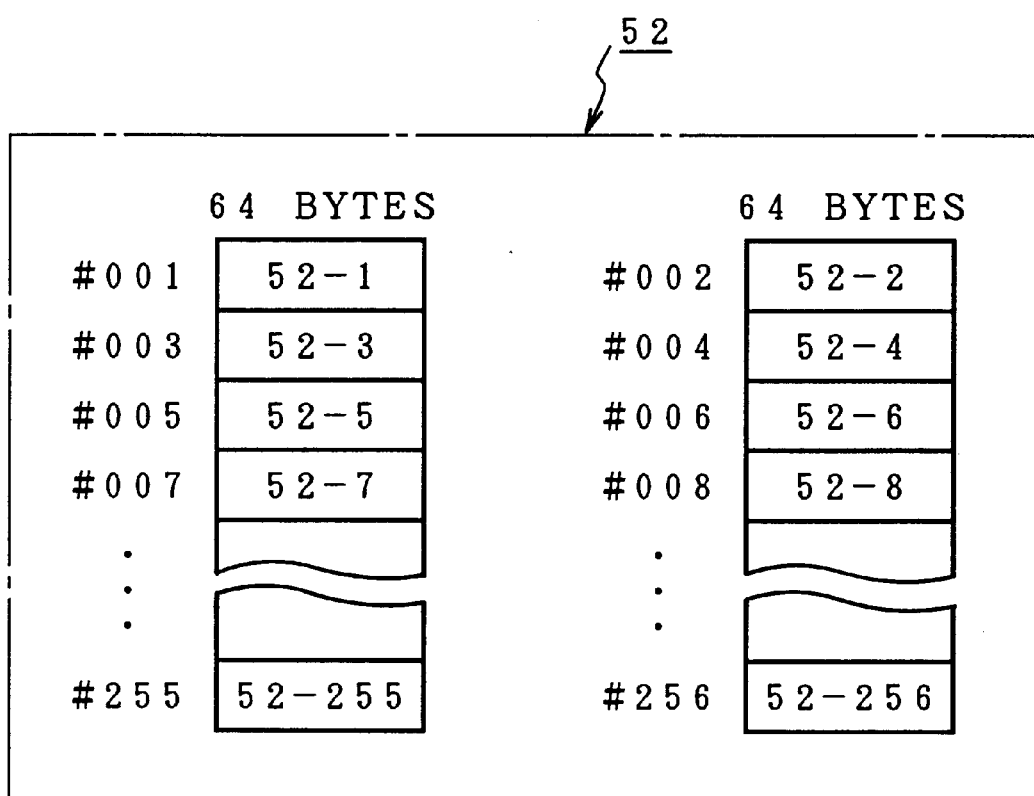
FIG. 11 is an explanatory diagram of a career management table.
Figure 12:
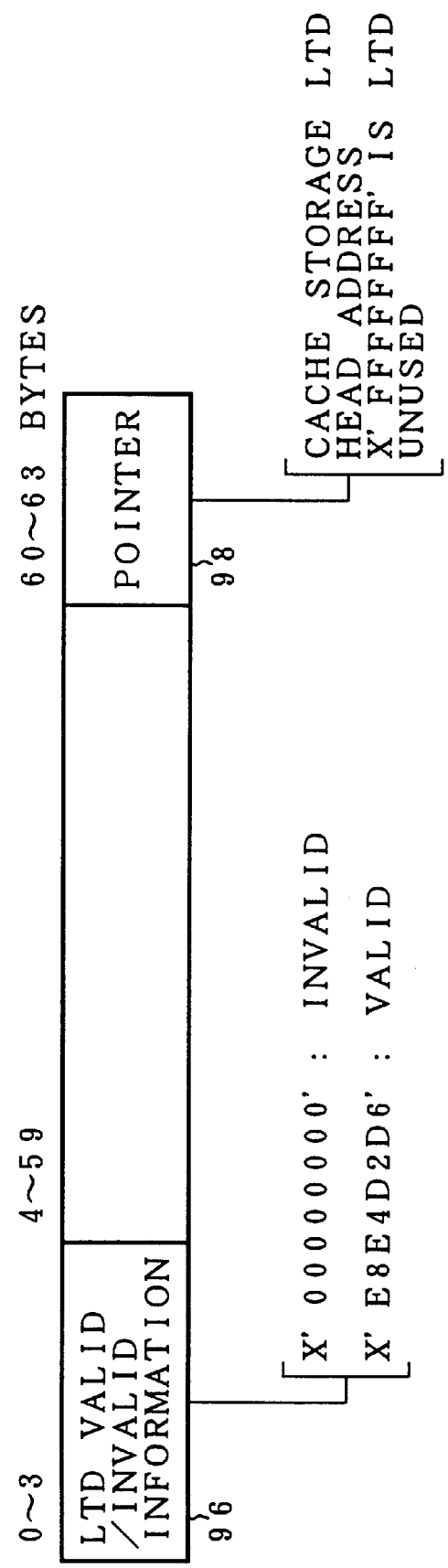
FIG. 12 is an explanatory diagram of a format of career management table information.
Figure 13:
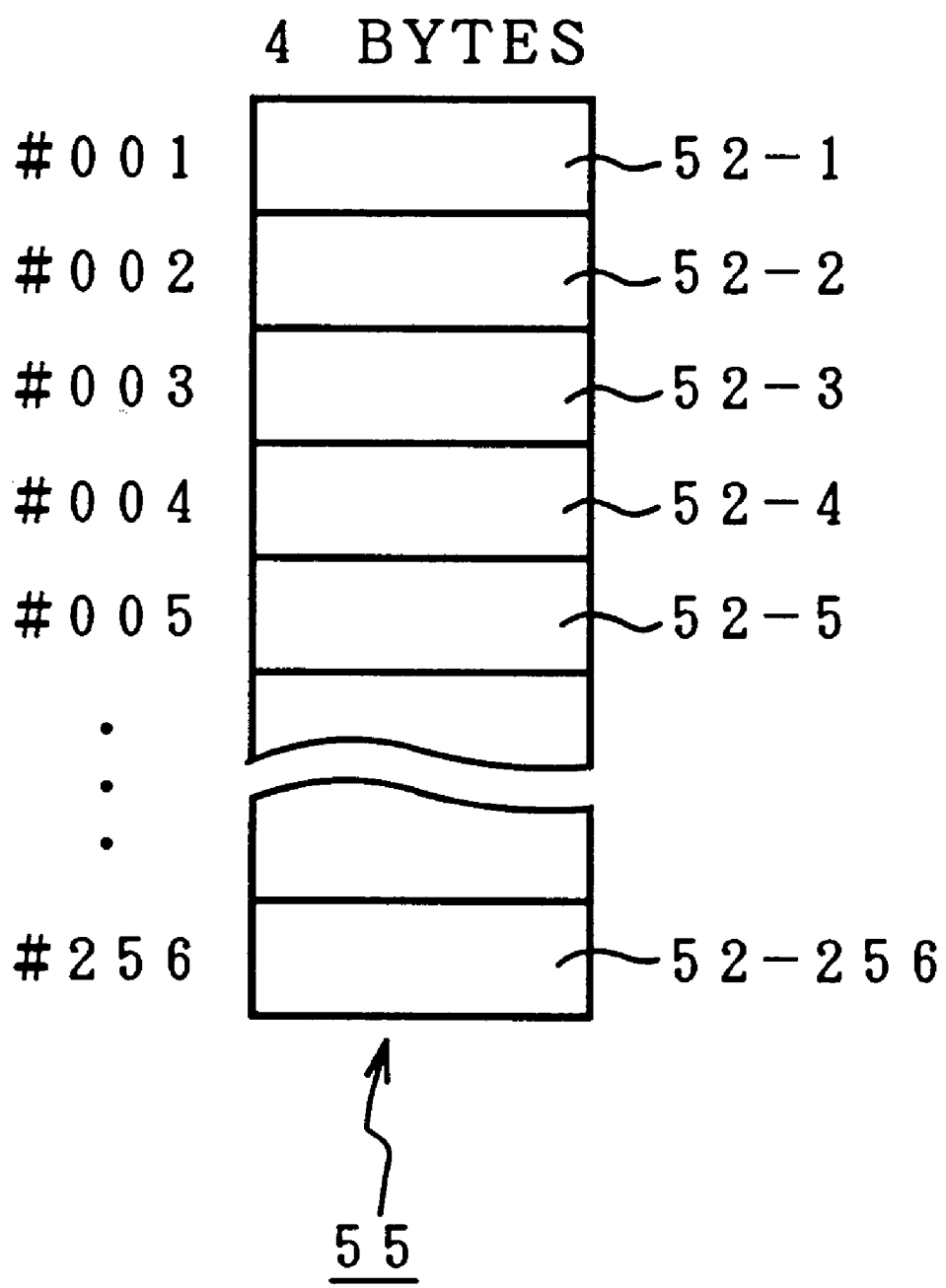
FIG. 13 is an explanatory diagram of an LTD pointer table.

FIG. 10 shows a storage state of the LTD 50 developed in the cache memory 32 in FIG. 3. FIG. 11 shows an outline of the career management table 52 stored in the non-volatile cache memory 30 in FIG. 3. First, when it is assumed that the maximum number of disk units which can be connected to the disk control unit is equal to 256, the career management table of FIG. 11 has career management data 52-1 to 52-256 of the 64-byte areas in correspondence to the device Nos. #001 to #256. FIG. 12 shows one of the career management data in FIG. 11. The career management data is constructed by LTD valid/invalid information 96 of head four bytes and pointer information 98 of last four bytes. When the disk unit of the corresponding device No. is installed and connected to the disk control unit and is in a usable state, for example, X'E8E4D2D6' is stored as LTD valid information in the LTD valid/invalid information 96. On the other hand, when the disk unit is not installed or connected to the disk control unit 12 or in the case where the disk unit is not used even if it is installed, invalid information is stored. For instance, X'00000000' is stored as invalid information. The head address in the cache memory 32 in which the LTD corresponding to the device No. is stored as an address pointer 98. When X'FFFFFFFF' is stored in the address pointer 98, this means that the area of the LTD 50 is not held in the cache memory 32, and the disk unit is not connected or used. As shown in FIG. 13, the address pointer 98 can be also replaced by an exclusive-use LTD pointer table 55 in which address pointers 98-1 to 98-256 have been stored by using the device numbers #001 to #256 as entries.

For example, as shown in FIG. 3, now assuming that the six disk units 18-1 to 18-6 of the device Nos. #01 to #06 have been installed on the cache memory 32 in FIG. 10, the career management table 52 in FIG. 11 is referred in accordance with the order of the device Nos. #001 to #256 by the LTD forming function when the power supply is turned on. With respect to only the six disk units of the device Nos. #001 to #006 in which the LTD valid/invalid information 96 is valid, as shown in FIG. 12, LTD memory areas 50-1 to 50-6 are held on the cache. On the other hand, with regard to the remaining disk units of the device Nos. #007 to #256 in which the LTD valid/invalid information 96 in the career management table 52 is invalid, as shown in the areas shown by broken lines in FIG. 10, actually, table areas 50-7 to 50-256 of the recording format information are not assured on the cache memory 32 but those areas are released as cache data areas. In FIGS. 10 and 11, the device Nos. #001 to #256 are separated into banks of even numbers and banks of odd numbers, thereby performing the development on the cache memory and the management of the career management table 52. In the actual apparatus, the device numbers start from #000 and end at #255. Therefore, the odd banks on the left side in FIGS. 10 and 11 are actually the even banks and the even banks on the right side actually become the odd banks. However, there is no substantial difference. In the functional block of FIG. 3, although the function of the disk cache has been separated to the write cache control unit 44 and read cache control unit 46 and shown, in the actual apparatus, the control functions of the write cache control unit 44 and read cache control unit 46 are realized by units realized as cache functional engines. The transmission and reception of data between the host computer 10 and the disk apparatus side through the cache memory are realized by a function of a unit known as a resource manager.

[Outline of cache control]

A flowchart of FIG. 14 relates to a whole process of the cache control in the disk control unit of the invention and will be explained hereinbelow with reference to the functional block of FIG. 3. First, when the power supply of the magnetic disk subsystem is turned on, a predetermined initializing process is executed in step S1. In step S2, reading and developing processes of the LTD 50 are executed. Namely, with respect to the device Nos. #001 to #006 of the disk units which can be used at present, the head address in the LTD to be developed in the cache memory 32 is known by referring to the career management table 52 and the LTD 50 having the size of 480 bytes is sequentially developed in accordance with the order of the device Nos. #01 to #06. Subsequently, for example, as shown in the disk unit 18-1, the recording format information stored in the control apparatus using area 60 is read out from the corresponding one of the disk units 18-1 to 18-6 and developed into the LTD 50. In step S2, when the reading and developing processes of the LTD are finished, the disk control unit enters a ready-on state and waits for the input/output request from the host computer 10 in step S3. In step S3, when a write request in which an arbitrary record was designated is received from the host computer 10, the write request is discriminated in step S4. In step S5, the write cache control unit 44 requests the hit judging unit 36 to judge the occurrence of a hit. The hit judging unit 36 searches the cache management table 48 by using the track address corresponding to the designated record number as an entry. If the track address including the requested designated record exists, it is judged in step S6 that the hit occurred. In step S7, the relevant record in the cache data area 104 is updated. When the record is updated, the updating flag 64 in the cache management table 48 in FIG. 5 is set to 1. When the updating flag in the cache management table is set to 1, in case of performing a track segment sweepin gout process by the LRU unit 56, which will be obviously explained hereinlater, it will be understood that the updated record differs from the track data of the disk unit, so that a disk writing operation by the writeback process is executed. On the other hand, when the relevant track address does not exist by the search of the cache management table 48, the occurrence of the mishit is judged in step S6, so that the processing routine advances to step S8 and the LTD 50 is referred. By the reference to the LTD 50, the writing position of the designated record on the cache data area 104 is specified. Even when the track data is not developed on the cache data area 104, the requested designated record is written. The cache writing process by the reference to the LTD 50 will be further clearly explained hereinlater. The reference to the LTD 50 when there is a write request is executed only in case of a cache mishit. When the cache mishit occurs, the reference to the LTD 50 is inhibited because there is a possibility such that the track format on the cache memory which causes a hit and the contents of the LTD 50 at that time differ. A state in which the track format on the cache memory and the recording format information of the LTD 50 do not coincide as mentioned above corresponds to the case where even if the recording format is changed on the cache memory on the basis of a format write request from the host computer, the LTD 50 is not immediately updated. The LTD 50 is updated when the track data subjected to the format writing operation is written back to the corresponding disk unit. Therefore, there is a possibility of the occurrence of a state such that the recording format on the cache memory and the contents of the LTD 50 do not coincide. In step S8, when the cache writing process with reference to the LTD 50 is finished, the end of process is responded to the host computer 10 in step S9. Thus, even if the write request from the host computer 10 causes a cache mishit, the process is promptly finished by the process on the cache memory. Since all of the processes at the time of the mishit for the write request from the host computer can be finished on the cache memory, for example, in the case such that the disk units 18-1 to 18-6 with a RAID construction are provided as actual devices for the string controller 16, improvement effects in the cache writing operation are obtained in terms of the following points.

I. Updating process which is not accompanied with the reading operation, namely, the update writing II. Random updating process which is not synchronized with the reading process; for example, updating of great amount of data base or the like III. Updating process of data exceeding a cache space As for those processes, in case of the disk units of the RAID construction, a hit judging process is certainly performed after completion of the actual reading operation from the disk unit. When a mishit occurs in case of the disk units of the CKD format, a write through process for directly writing to the disk unit is executed, so that the effect to be obtained by providing the disk cache cannot be derived. However, in the disk cache using the LTD 50 in which the recording format information of all of the tracks of the disk units of the invention has been stored, the recording format information of the requested track has been stored on the disk control unit 12 side. Therefore, for example, even if an update write command is issued in the cache mishit state, the processes can be completed only on the cache memory without needing the staging process from the disk unit or the write through process to directly write to the disk unit. On the other hand, when the input/output request from the host computer 10 indicates the format write, a check is made to see if the request is the format write request or not in step S11. The processing routine advances to the format writing process in step S12. As a format write request from the host computer 10, there are two kinds of requests for a format write to change all of the records of the CKD format in FIG. 4 and a format write to change the record R1 and subsequent records as user areas. When the format writing operation to change the whole track is performed, the very new record format information table 50 is formed. On the other hand, with respect to the format write of the record R1 and subsequent records as user areas, since it is ordinarily executed on a track unit basis, the contents of the recording format information table 50 are updated with respect to only the track address subjected to the format writing process. The details of the format writing process will be also clearly explained hereinlater. Further, when the input/output request from the host computer 10 is the read request, step S13 follows. In this case, the read cache control unit 46 requests the hit judging unit 36 to judge the hit. The hit judging unit 36 searches the cache management table 48 by using the track address including the designated record of the read request as an entry. When the designated record exists, there is a hit in step S14. The corresponding record is read out and transferred to the host computer 10 in step S16. An end of process is responded in step S17. On the other hand, when a mishit occurs in step S14, step S15 follows and the staging process from the disk unit is executed. At the time of the staging process, the read cache control unit 46 can judge whether the requested record exists on the track or not with reference to the LTD 50 of the relevant disk unit. That is, as shown in FIG. 7, the number of records 82 of the track has been stored in the LTD 50. When the requested record number exceeds the number of sectors of the number of records 82, it will be understood that the requested record doesn't exist on the track even when the disk unit is not actually accessed. Therefore, a failure in reading process can be immediately reported to the host computer. Further, in the staging process in step S15, for the number of records of the reading process requested from the host computer 10, the number of records per one track can be known from the LTD 50 and it is possible to judge whether the requested record number is one track or a plurality of tracks. Therefore, in the case where the necessity of the staging process corresponding to a plurality of tracks is judged, the staging process by the parallel access of the disk units can be requested to the device adapter side. After completion of the processes in association with the write cache control and read cache control as mentioned above, in step S10, the presence or absence of an instruction to stop the disk control unit is discriminated. The processes based on the input/output request from the host computer 10 in step S3 are repeated until there is the stop instruction. In step S10, when the presence of the stop instruction for the disk control unit 12 is judged, the process to write back the LTD 50 to the disk unit is executed in step S18. In the writeback of the LTD 50 to the disk unit, the LTD 50 developed on the cache memory 32 can be also stored into the control apparatus using areas 60 of all of the corresponding disk units 18-1 to 18-6. However, the recording format on the cache memory and the recording format on the disk unit coincide and they are synchronized, there is no need to write back. Therefore, it is sufficient to write back to the disk unit with respect to only the LTD 50 in an asynchronous state in which the recording format on the cache memory and the recording format on the disk unit don't coincide. As for the writeback to assure a synchronism between the LTD 50 on the cache memory 32 and the recording format information in the control apparatus using areas 60 on the disk units 18-1 to 18-6, when the stop instruction is received, it is sufficient to write back to the corresponding disk unit with regard to only the LTD 50 in which the invalid information about the LTD valid/invalid information 96 has been set with reference to the career management table 52 having the contents of FIG. 12. The details of the writeback process will be also clearly explained hereinlater. In step S18, when the writing process to the disk unit is finished, an end process necessary for the disk control unit 12 itself is performed in step S19. The power supply is stopped. Therefore, even in the stop state due to the power shut-off of the disk control unit, the recording format information has been stored and preserved in the disk units 18-1 to 18-6, thereby enabling the LTD 50 to be developed onto the cache memory 32 when the power supply of the disk control unit 12 is turned on and the control unit is activated. Since the own LTD has been stored in each of the disk units 18-1 to 18-6 themselves, the LTD can be physically integratedly moved together with the disk units 18-1 to 18-6. Even when the disk units are exchanged for the string controller 16 or when the disk units are replaced to another disk control unit, the LTD can be effectively used. In the case where the LTD 50 is provided for the non-volatile cache memory 30 instead of the volatile cache memory 32, the writeback process to the disk unit is unnecessary.

[Cache writing process at the time of mishit]

Figure 14:
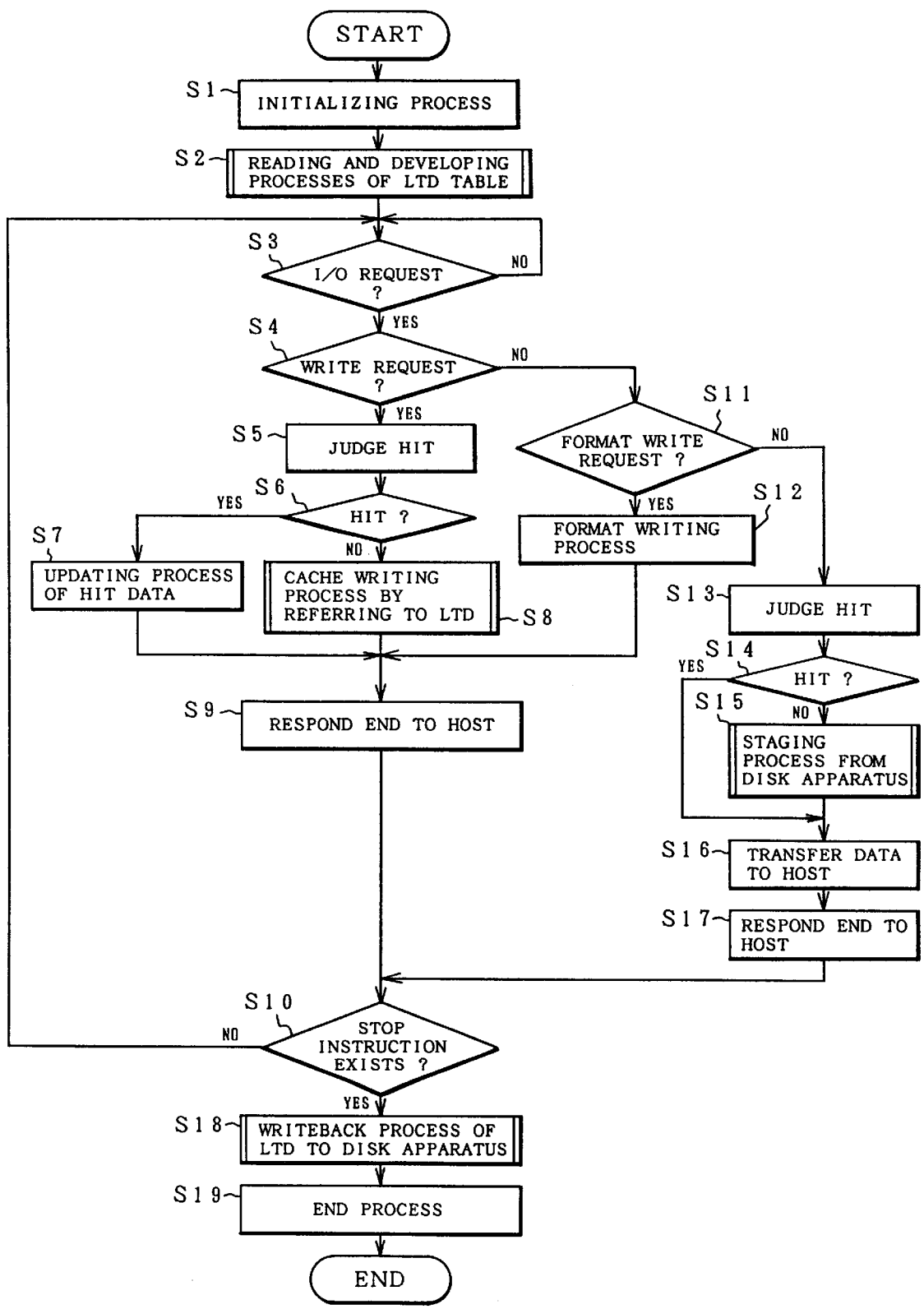
FIG. 14 is a flowchart for a whole process of a cache control.
Figure 15:
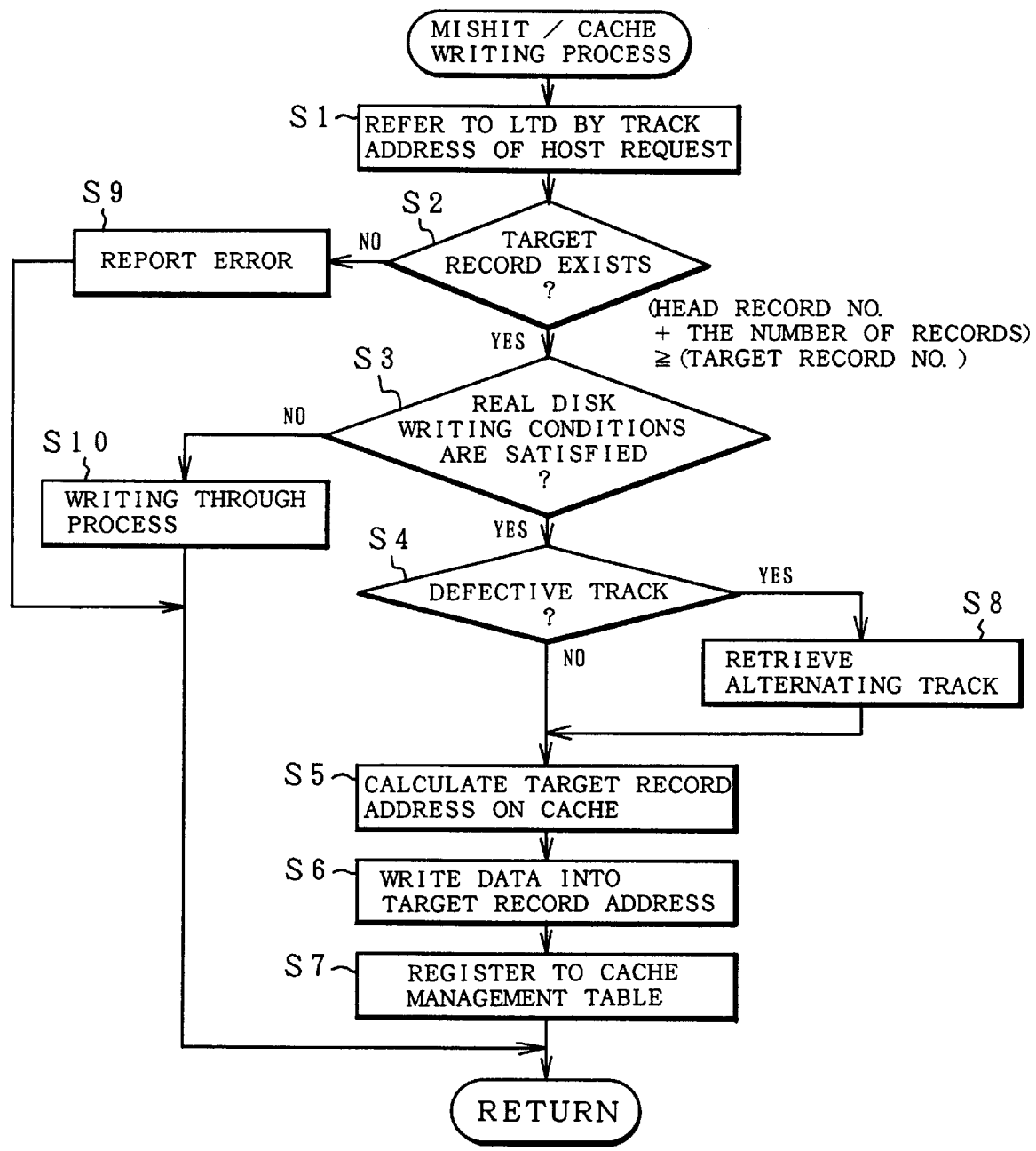
FIG. 15 is a flowchart for a cache writing process when a mishit occurs.

A flowchart of FIG. 15 shows the details of the cache writing process at the time of a mishit by reference to the LTD in step S8 in FIG. 14. First in step S1, the LTD 50 is referred by the track address including the record designated by the write request from the host computer 10. In step S2, a check is made to see if the target record exists on the track or not. Namely, the number of sectors indicative of the number of records 82 on the track of the LTD 50 in FIG. 8 is compared with the designated record number. When the designated record number is smaller, it is judged that the target record exists on the track. When the designated record number is larger than the number of sectors of the number of records 82 on the table, the target record doesn't exist on the track. Therefore, step S8 follows and an error is reported to the host computer. When the target record exists on the track in step S2, step S3 follows and a check is made to see if the writing conditions of the actual disk unit are satisfied or not. In the embodiment, when the following six conditions are satisfied with reference to the LTD, it is judged that the writing conditions to the actual disk unit are satisfied.

I. The record R0 has the standard format of the key length KL=0 and data length DL=8. However, the data unit doesn't always need to be all zero.

II. In all of the records after the record R1, the key lengths KL=0 and data lengths DL are equal. That is, the equal length recording format.

III. All of the record numbers after the record R1 are based on the ascending order. However, the record R1 can be also started from an arbitrary record number.

IV. All of the values CCHH of the count units after the record R0 are identical. However, there is a case where the logical CCHH differs from the actual seek value. In such a case, it is sufficient that CCHH after the record R1 are identical.

V. Since no key unit is stored in the LTD 50 (KL=0), a channel command word train which is not accompanied with a key search.

VI. The CKD command system or extended CKD command system.

When the above conditions are satisfied, the processing routine advances to step S4 and a check is made to see if the track is a defective track or not. Namely, with respect to the flag 76 in the recording format information in FIG. 8, the defective track flag 86 is discriminated. When the defective track flag 86 is set to 1, it is known that the track is a defective track. By using the defective track address as an entry, the alternating track address 94 is obtained with reference to the defective alternating track correspondence table 54 in FIG. 9 in step S7. The address of the target record on the cache memory is calculated in step S5. Specifically speaking, in the LTD 50 in FIG. 7, the first record number subsequent to the record R0 is known by the record number 78. By multiplying the sector length of the record length 80 to the number of records from the head record No. to the target record, thereby calculating the head address of the target record. In step S6, the requested record data is written into the target record address in the cache data area 104 of the cache memory 32. In step S8, the record data is registered into the cache management table 48 in FIG. 5. In this case, the updating flag 64 is set to 1, thereby making it possible to write back to the corresponding disk unit when sweeping out by the LRU 56. On the other hand, when the conditions I to VI are not satisfied in step S3, the write through process in step S10 is executed.

[LRU process and writeback process]

Figure 16:
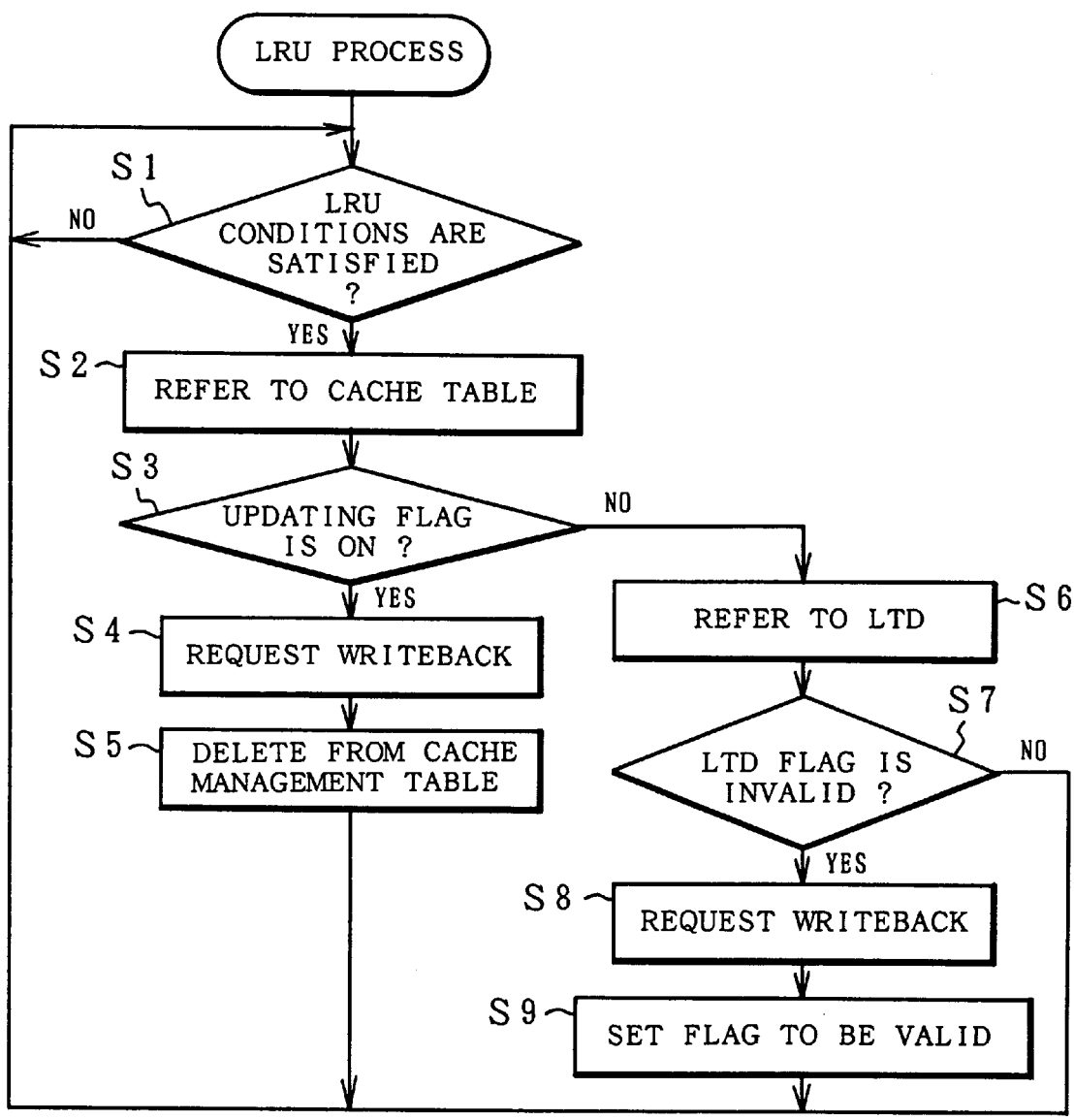
FIG. 16 is a flowchart for an LRU process.

A flowchart of FIG. 16 relates to a data sweeping out process by the cache invalidation by the LRU unit 56 in FIG. 3. When the track segment or partial track segment stored in the cache data area 104 of the cache memory 32 as shown in FIG. 6 is not accessed for a predetermined time, a cache invalidating process associated with the cache sweep-out by the LRU unit 56 is executed. When sweeping out by the LRU unit 56, first in step S2, the cache management table 48 in FIG. 5 is referred. In step S3, a check is made to see if the updating flag 64 has been set to 1 or not. When the updating flag 64 is set to 1, the track segment updated on the cache memory differs from the track data of the actual disk unit. Therefore, in step S4, the writeback process is requested to the device adapters 40-1 and 40-2. The cache segment after completion of the sweep-out is deleted from the cache management table 48, thereby invalidating the track segment in the cache data area 104 after completion of the sweep-out. On the other hand, when the updating flag 64 in the cache management table 48 is reset to 0, step S6 follows and the LTD 50 is referred. In step S7, a check is made to see if the LTD flag 90 in the flag 76 of the LTD 50 in FIG. 8 is invalid or not. When the LTD flag 90 is reset to 0 and is invalid, in step S8, the writeback is requested to the device adapters 40-1 and 40-2. The LTD flag 90 of the LTD 50 is invalid when the format writing operation after the record R1 of the user area from the host computer 10 has been executed. Moreover, such a case corresponds to a state in which after completion of the format writing operation, the write request for the track is not performed and the registration to the cache management table 48 is not executed. Therefore, with respect to the track segment in such a state, the writeback to the disk unit is requested, thereby making the corresponding track of the disk unit coincide with the contents of the formatting process in which the recording format of the user area is changed. After the writeback was requested in step S8, when an end reports of the writeback are received from the device adapters 40-1 and 40-2, the LTD flag is set to 1 indicative of the valid state.

Figure 17:
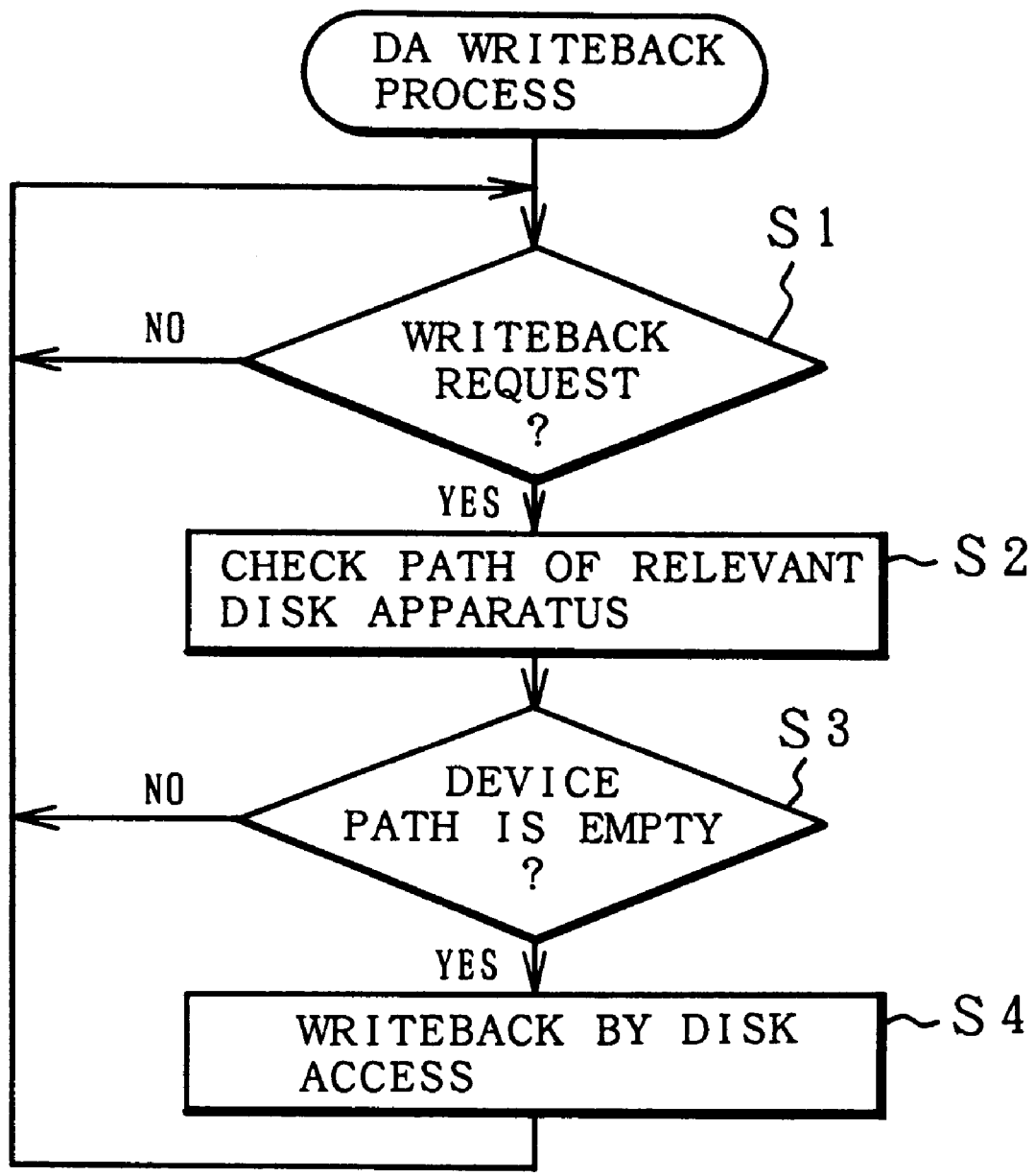
FIG. 17 is a flowchart for a writeback process by a device adapter.

A flowchart of FIG. 17 relates to a writeback process to the disk unit by the device adapters 40-1 and 40-2. The device adapters 40-1 and 40-2 discriminate the presence or absence of the writeback request from the write cache control unit 44 side. When the writeback request is received, the processing routine advances to step S2 and the device bus for the relevant disk unit is judged. When a non-using state of the device bus continues for a predetermined time, in step S3, it is judged that the device bus is empty. The writeback to write the requested track data is executed by the relevant disk access.

[Initial forming process of LTD]

Figure 18:
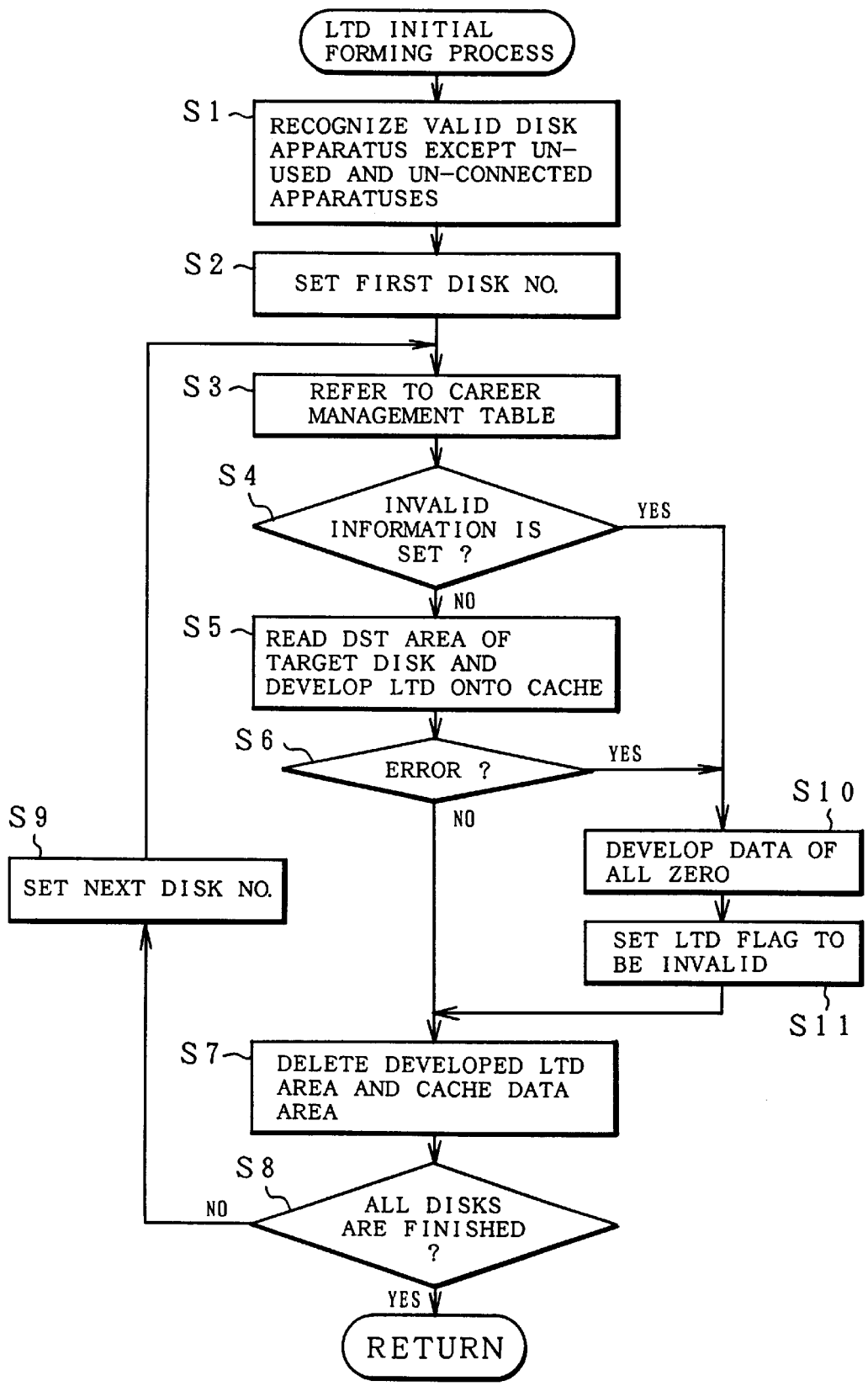

A flowchart of FIG. 18 shows the details of the initial formation of the LTD 50 when the power supply of the system is turned on. First in step S1, among the disk units connected to the disk control unit 12, the disk units which can be effectively used excluding both of the disk units which are not used and the disk units which are not connected are recognized. For example, in FIG. 3, six disk units 18-1 to 18-6 having the disk Nos. #01 to #06 are recognized as valid disk units. In step S2, the first disk No. #01 among the valid disk units is set. In step S3, the career management table 52 is referred. As shown in FIG. 12, the LTD valid/invalid information 96 is provided in the career management table 52. A check is made in step S4 to see if the invalid information has been set or not. When the invalid information is not set and the valid information is set, it will be understood that the LTD information stored in the control apparatus using area 60 in the disk unit 18-1 of the disk No. #01 has effectively been updated. From the head address in the cache data area 104 that is designated by the pointer information 98 in the career management table 52, the LTD read out from the control apparatus using area 60 of the disk unit 18-1 is developed onto the cache. Subsequently, in step S6, a check is made to see if there is an error in the reading operation of the LTD information from the disk unit 18-1 or not. When the LTD information can normally be read and developed, in step S7, the area of the developed LTD is deleted from the cache data area 104. On the other hand, in step S6, when there is an error in the read access from the disk unit 18-1, data of all zero is developed into the LTD 50 in step S10. Further in step S11, the LTD flag is set to be invalid. By the setting of the invalid state of the LTD flag, a new forming process of the LTD information is executed when the format writing is requested from the host computer 10 later. After completion of the processes in steps S1 to S7, a check is made in step S8 to see if all of the processes of the valid disk units which can be used have been finished or not. If the processes of all of the disks are not finished, the next disk No. #02 is set in step S9. The processes from step S3 are repeated until the end of the processes of all disks.

[Writeback process of LTD]

Figure 19:
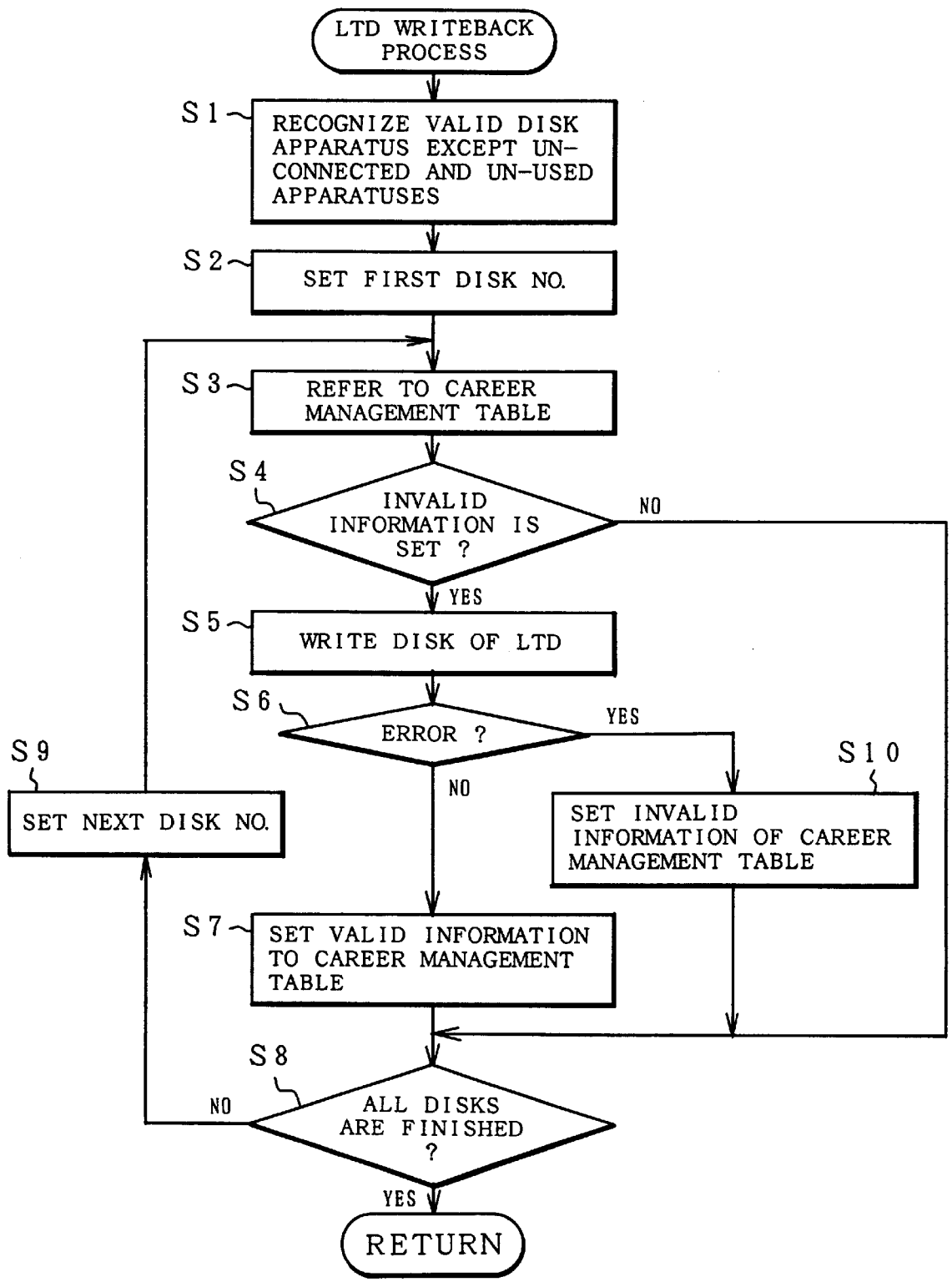
FIG. 19 is a flowchart for a writeback process of the LTD when the power supply is shut off.

FIG. 19 shows the details of the writeback process of the LTD to the disk unit in step S18 in FIG. 14. When the end instruction is issued prior to the shut-off of the power supply of the disk control unit, the LTD writeback process in FIG. 19 is started. First in step S1, the valid disk units other than both of the disk units which are not connected and the disk units which are not used are recognized. In step S3, the first disk number, for example, disk No. #01 is set. In step S3, the career management table 52 is referred. In step S4, a check is made to see if the invalid information has been set or not. When the invalid information is set, this means an asynchronous state in which the LTD information on the cache memory and the LTD information on the disk unit do not coincide. Therefore, the writing of the LTD information to the disk unit is requested to the device adapters 40-1 and 40-2 in step S5. Thus, the disk adapters 40-1 and 40-2 write the recording format information to the designated disk unit 18-1. In step S6, the presence or absence of an error is discriminated. When there is no error, in step S7, the valid information is set into the career management table 52, thereby indicating that the LTD information of the disk unit 18-1 has normally been updated. On the other hand, when an error occurs in the writing operation to the disk unit, since the LTD information of the disk unit is not normally updated, the invalid information is set into the career management table 52. By the setting of the invalid information, the development of the LTD 50 onto the cache memory from the disk unit is blocked when the power supply is subsequently turned on. In step S4, when the valid information has been set in the career management table 52, since the recording format on the cache and the recording format on the disk unit coincide and a synchronous state is assured at this time point, the writeback of the LTD information to the disk unit in steps S5 to S7 is not executed. In step S8, a check is made to see if the processes for all disk units have been finished or not. In step S9, the disk No. #02 of the next disk unit 18-2 is set. The processes from step S3 are repeated until the processes for all disk units are finished.

Figure 20:
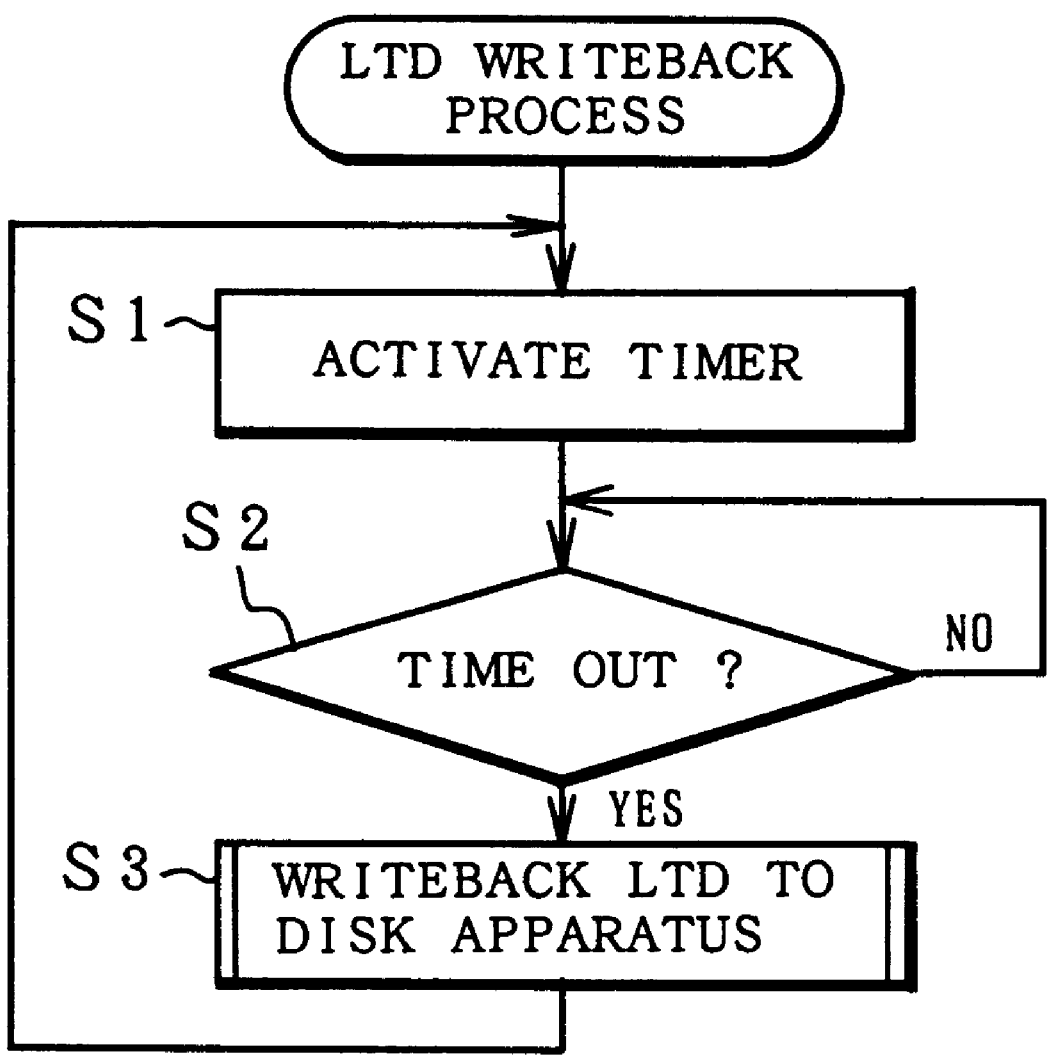
FIG. 20 is a flowchart for a periodic LTD writeback process.

FIG. 20 shows another embodiment of the writeback process of the LTD 50 to the disk unit. In addition to the processes in FIG. 19, the writeback process can be provided as an option. The writeback process in FIG. 20 is characterized in that the writeback process is executed at every predetermined time during the operation of the apparatus. First in step S1, the timer is activated. In step S2, a check is made to see if, for example, ten minutes have passed or not. When ten minutes elapse, it is judged that there is a time-out. The processing routine advances to step S3. The writeback of the LTD to the disk unit is performed. The writeback to the disk unit is substantially the same as the processes in steps S3 to S10 in FIG. 19.

Figure 21:
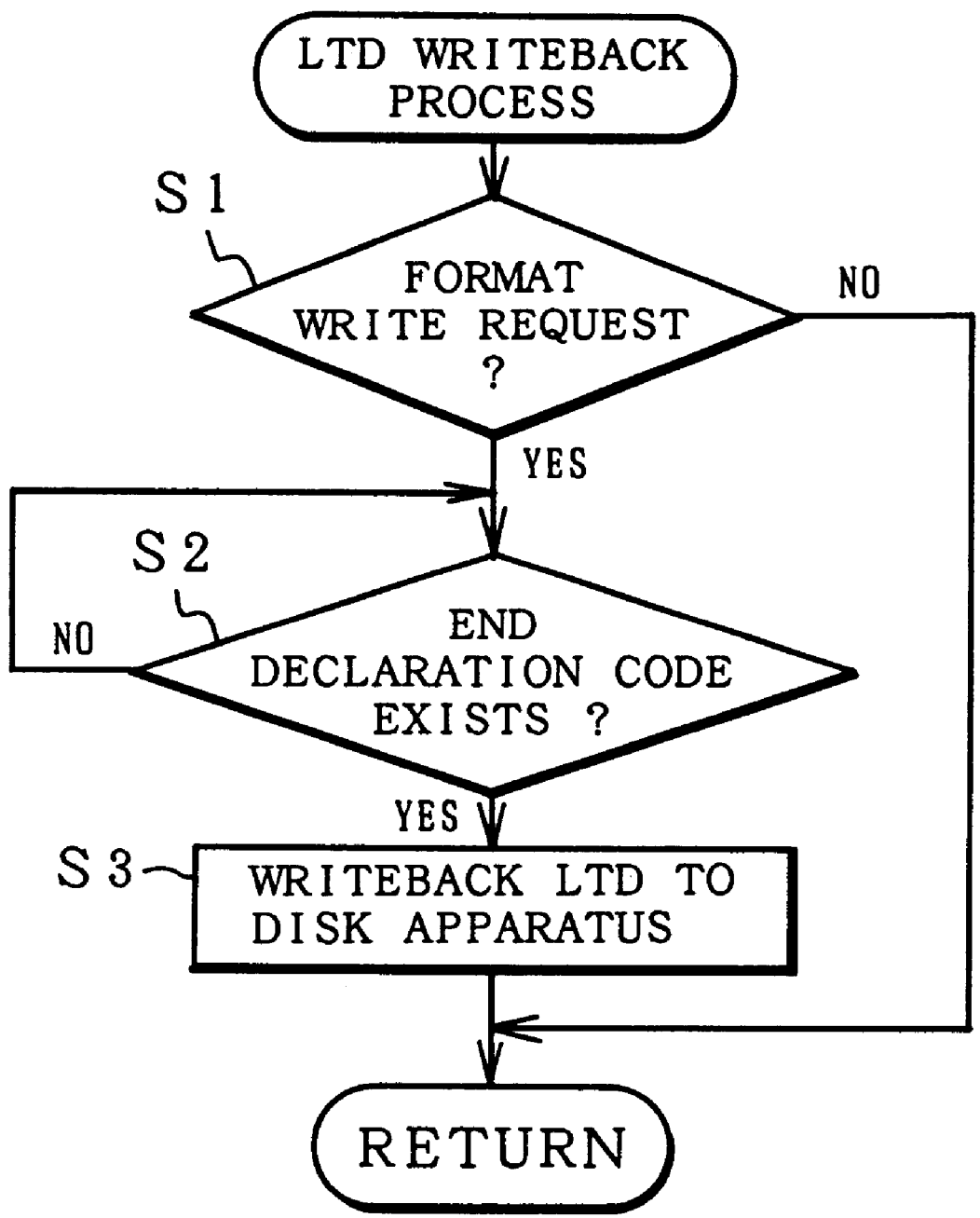
FIG. 21 is a flowchart for a writeback process of the LTD in association with the end of a format writing process to change a recording format.

A flowchart of FIG. 21 shows another embodiment of the writeback process of the LTD 50. In a manner similar to the embodiment of FIG. 20, the writeback process can be provided as an option for the fundamental writeback process in FIG. 19. The writeback process is characterized in that the last of a channel command word chain for performing a series of input/output processes in association with the format writing as a device initializing process from the host computer is discriminated and the writeback process to the disk unit is executed. To execute the processes in FIG. 21, first on the host computer 10 side, an end declaration code to declare that the channel command word chain is the last of the format writing process is provided as a subparameter of the channel command to execute the format writing. For this purpose, in the processes in FIG. 21, when it is judged in step S1 that there is a format write request from the host computer 10, the presence or absence of the end declaration code is judged in step S2. When the series of processes in association with the format write request are finished and the end declaration code provided as a subparameter. of the last input/output request is finished in step S2, since the updating of the LTD 50 in association with the format writing has already been finished, the LTD 50 is written back to the disk unit in step S3. The writeback to the disk unit corresponds to the processes in steps S3 to S10 in FIG. 19.

[Forming process of LTD]

Figure 22:
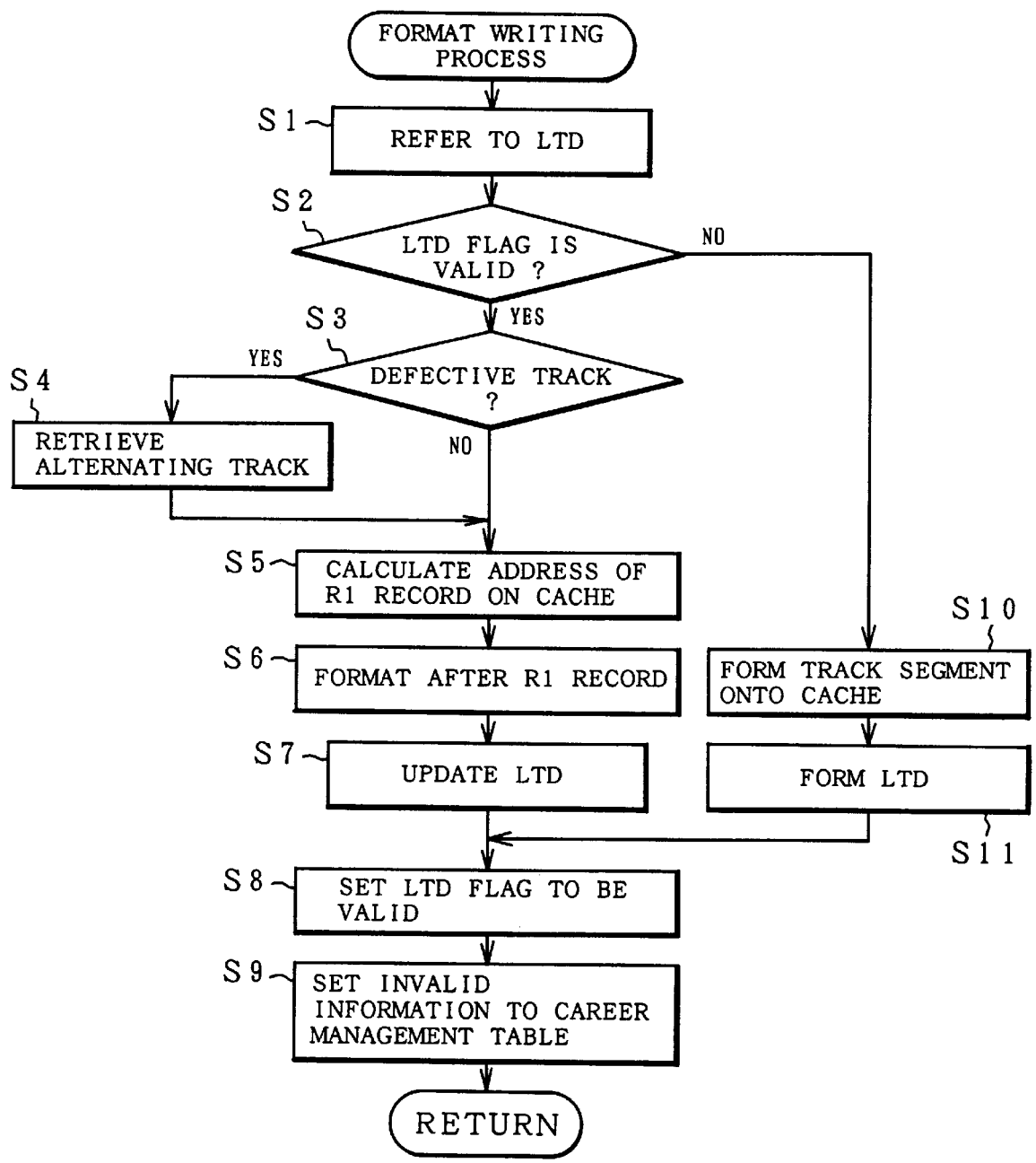
FIG. 22 is a flowchart for forming and updating the LTD at the time of the format writing operation to change the recording format.

A flowchart of FIG. 22 shows the details of the format writing process in step S12 in FIG. 14. In the invention, the LTD is updated or formed at the time of the format writing process. When the format writing is requested from the host computer 10, first in step S1, a check is made to see if the LTD flag of the track is valid or not with reference to the LTD 50 of the designated device number. When the LTD flag is valid, since this means the format writing after the record R1 as a user area, a check is made to see if the track is a defective track or not in step S3. When it is the defective track, the alternating track is searched in step S4, thereby specifying the target track. Subsequently in step S5, the address of the record R1 as a user area is calculated from the contents of the LTD 50. In step S6, the records after the record R1 are formatted. In step S7, the LTD information of the track address of the LTD 50 after it was formatted is updated. In step S8, the LTD flag is set to be valid. In step S9, the invalid information is set into the career management table 52, thereby indicating an asynchronous state in which the recording format on the cache memory and the recording format on the disk unit do not coincide. As for such a state in which the recording format information does not coincide, a synchronism is assured at the time of the writeback process in FIG. 19. On the other hand, when the LTD flag is invalid in step S2, it is necessary to perform the format writing for producing the whole track data. In step S10, the track segments of one track are formed on the cache memory. In step S11, the LTD information corresponding to the LTD 50 is formed and stored. In the formation of the track segments and LTD information in steps S10 and S11, an error occurs in the reading operation of the LTD information from the disk unit by the initial forming process of the LTD in FIG. 18. With respect to the LTD in which the data of all zero is developed, the track segments and LTD information by the format writing are formed with respect to all of the tracks.

Figure 23:
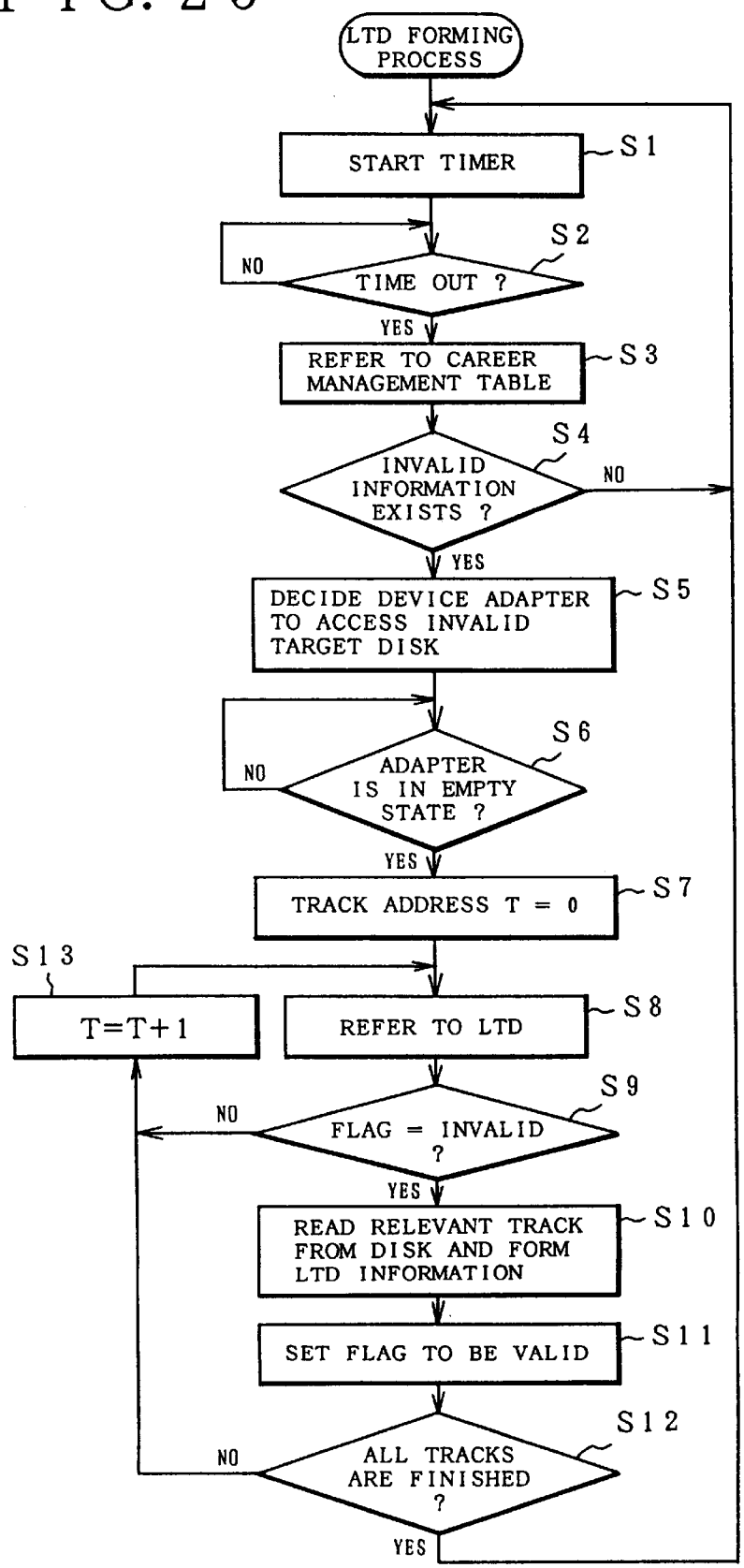
FIG. 23 is a flowchart for a periodic LTD forming process.

A flowchart of FIG. 23 relates to another embodiment of the LTD information forming process in the invention. The embodiment is characterized in that the LTD information is formed by periodic patrol processes during the operation of the apparatus. First in step S1, a timer is started. In step S2, the recording format information forming process is started by the time-out after the elapse of a predetermined time. In step S3, the career management table 52 of the valid disk units which can be used is referred. In step S4, the device No. of the disk unit in which the invalid information is set is discriminated. In step S5, the device adapter to access the target disk in which the invalid information is set is determined. In step S6, an empty state of the adapter is judged. When it is judged that the adapter is empty, a track address (T) is set to T=0 in step S7. The LTD 50 is referred in step S8. A check is made in step S9 to see if the LTD flag of the track address is invalid or not. When the LTD flag is invalid, this means that no LTD information exists. Therefore, in step S10, the relevant track is read from the target disk unit, the read track is analyzed, and the LTD information is formed and stored into the LTD 50. In step S11, the LTD flag is set to be valid. Finally in step S12, a check is made to see if the processes for all tracks have been finished or not. If NO, the track address (T) is increased by "1" in step S13 and the processes from step S8 are repeated. In step S9, when the LTD flag of the track address that was referred is valid, since there is no need to form the LTD information, the track address (T) is increased in step S13. The processing routine advances to the process of the next track address.

Figure 24:
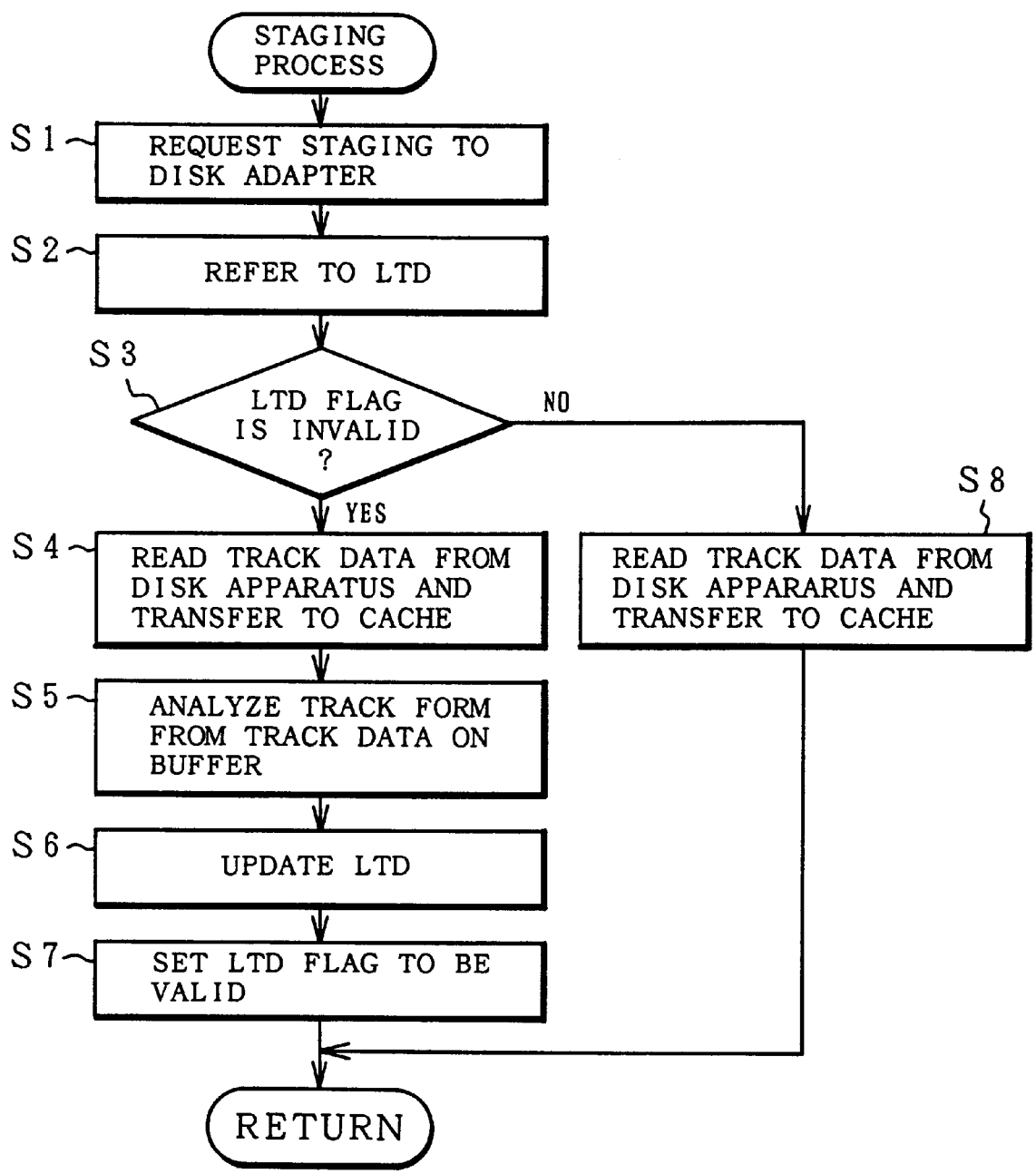
FIG. 24 is a flowchart for an LTD forming process in association with a staging.

FIG. 24 shows another embodiment of the LTD forming process in the invention. The embodiment is characterized in that the LTD information is formed at the time of the staging process from the disk unit by the read cache control unit 46. At the time of the staging process by the read cache control unit 46, first in step S1, the staging process is requested to the disk adapters 40-1 and 40-2. In step S2, the relevant track address of the LTD 50 is referred. In step S3, a check is made to see if the LTD flag is invalid or not. When the LTD flag is invalid, since the LTD information is not formed, the track data is read out from the disk unit and transferred to the cache memory in step S4. After that, in step S5, the track data stored in the buffer memory on the device adapter side is analyzed and the LTD information is formed. In step S6, the LTD information of the corresponding track address of the LTD 50 is updated. Finally in step S7, the LTD flag of the track address that was updated is set to be valid. On the other hand, when the LTD flag is valid in step S3, since the LTD information has already been formed, the ordinary staging process for reading out the track data from the disk unit and transferring to the cache memory is executed.

[Forming process of LTD when extension]

Figure 25:
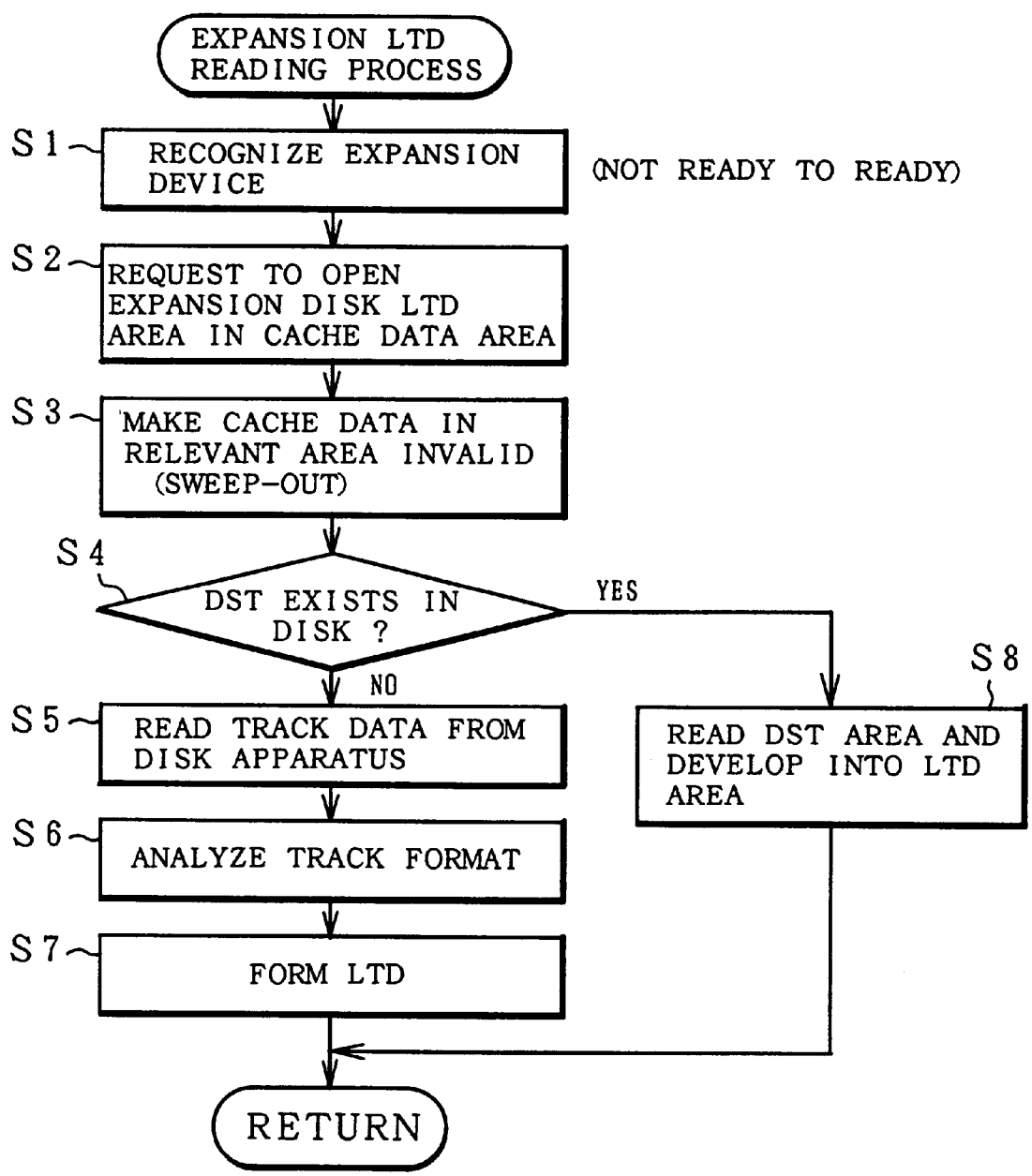
FIG. 25 is a flowchart for an LTD forming process when a disk unit is extended.

A flowchart of FIG. 25 shows a forming process of the LTD when another disk unit is newly extended for the disk control unit 12 in addition to the disk units 18-1 to 18-6. First in step S1, the disk control unit 12 recognizes the extension of the disk unit. The extension of the disk unit can be known since extension information (NOT READY TO READY) of the disk unit in association with the extension is recognized and notified on the side of the device adapters 40-1 and 40-2. When the extended device is recognized, in step S2, in order to assure the table area of the device No. of the extended disk unit, for example, device No. #07, it is requested to release the area of a predetermined size such as 540 bytes from the head address of the table that is designated by the pointer of the career management table 52. In response to the release request of the cache data area, in step S3, the cache data in the relevant area is invalidated, namely, is swept out. In step S4, a check is made to see if the LTD information has been stored in the control apparatus using area 60 of the extended disk unit or not. When the LTD information is not stored, the track data is read out from the extended disk unit in step S5. In step S6, the track format is analyzed and the LTD information is formed. In step S7, the LTD formation to write the LTD information into the LTD 50 on the cache memory assured newly is executed. When the LTD information is stored in the extended disk unit, in step S8, the LTD information in the control apparatus using area 60 is read out and developed in the LTD area newly assured in the cache data area in a manner similar to the case of the turn-on of the power supply.

[Parallel staging process]

Figure 26:
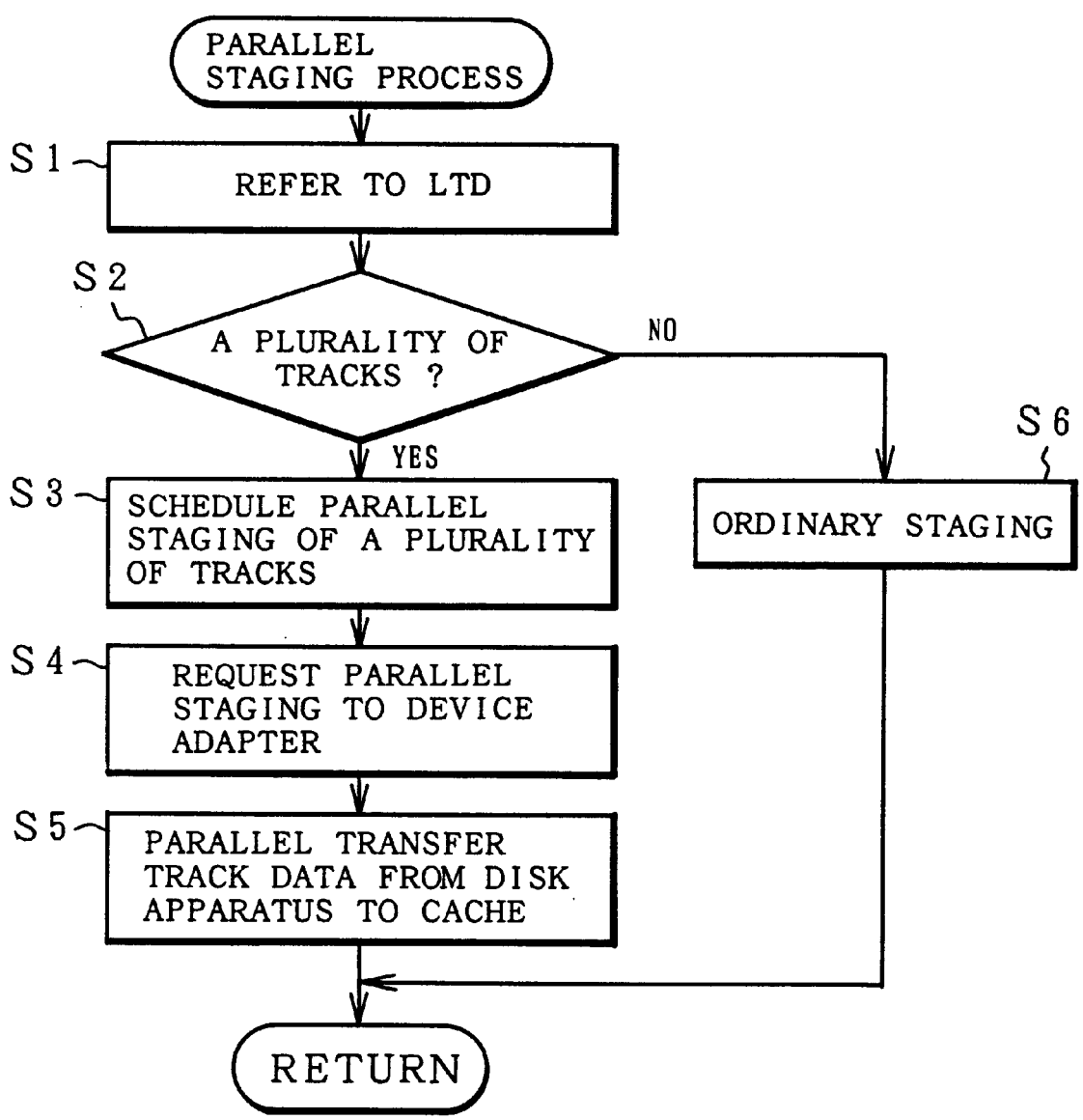
FIG. 26 is a flowchart for a parallel staging process.

A flowchart of FIG. 26 relates to a parallel staging process by the read cache control unit 46 by using the LTD 50. In response to the read request from the host computer 10, when a mishit occurs in the read cache control unit 46, there is a case where the staging from the disk unit side is executed for a plurality of tracks. In the ordinary staging, the same device adapter executes the staging every track in accordance with the order. Such a staging process is executed because the number of records existing on one track cannot be specified in the actual disk unit. Namely, generally, only after the record of the track of the disk unit was searched and the index was detected, whether the number of records requested reaches the next track number or not can be judged. On the other hand, according to the invention, since the track format information has been stored in the disk control unit 12, whether the records of the number designated by the read request from the host computer 10 exist on one track or a plurality of tracks can be recognized before the staging process is started. When it is judged that the records of the designated number exist on a plurality of tracks of a plurality of disk units, the staging processes for all tracks can be simultaneously started, the transfer preparation of the read data for the host computer can be promptly executed.

In FIG. 26, in response to the read request from the host computer 10, the read cache control unit 46 refers to the LTD 50 in step S1. In step S2, a check is made to see if the records of the requested number are distributed to a plurality of disk units and exist on a plurality of tracks or not. If YES, the parallel staging of the plurality of tracks is scheduled. On the basis of the scheduling, in step S4, the parallel staging is requested to the device adapters 40-1 and 40-2. When the number of requested tracks of the parallel staging exceeds the number of device adapters, the staging is requested to one disk unit in accordance with the order. In step S5, the staging processes from the disk unit by the device adapters according to the schedule are started in parallel. The track data is transferred in parallel to the cache data area 104 of the cache memory 32. When an amount of data that is transferred to the cache memory by the device adapter which started the staging for the first time reaches a predetermined data amount during the parallel transfer, a recoupling request for the channel adapters 24-1 and 24-2 is generated. After completion of the recoupling, the data after completion of the staging by the cache data area 104 of the cache memory 32 is transferred in parallel to the upper apparatus. By the parallel staging for the tracks of a plurality of disk units, the data transfer at the time of a mishit for the read request from the host computer can be performed at a high speed. In case of the staging of one track in step S2, the ordinary staging by the read access of the disk unit is executed.

[Verification of standard format]

In the disk control unit 12 in FIG. 3, when a write command of the format writing is received from the host computer 10, it is regarded that the recording format is the standard CKD format in which the key length of the record R0 of the CKD format of the disk unit is equal to 0 byte and the data length is equal to 8 bytes. The track data is formatted. However, there is a case where the track format of the disk unit temporarily doesn't become the standard CKD format in which the key length of the R0 record is equal to 0 byte and the data length is equal to 8 bytes. Such a situation occurs in the case where a medium defect or a reading failure occurs by the medium inspection at the time of the formatting of the disk medium and the inspection is temporarily interrupted or the like. The R0 record is formatted to a data length such as 16 bytes other than 8 bytes as a standard format. Therefore, even if the track data on the cache memory 32 of the standard CKD format which is determined by the format writing is tried to be written back to the disk unit, since the track format is not the standard format, it becomes a cause of a situation such that a validity of the track data cannot be guaranteed. Therefore, the standard flag 88 is provided in the flag 76 of the LTD 50 in FIG. 8 as information to identify the format. When the track format of the disk units 18-1 to 18-6 is the standard CKD format, the standard flag 88 is set to 1. When it is not the standard CKD format, the flag 88 is reset to 0. When the format writing from the host computer 10 is judged for each of the channel adapters 24-1 to 24-4, the standard flag 88 of the LTD 50 is referred. In case of the standard CKD format, a schedule to write back to the disk unit is instructed to the device adapters 40-1 to 40-4. When the format is not the standard CKD format, a writeback judging function to instruct the inhibition of the writeback schedule is provided for the table writeback unit 102. There are the following judging conditions of the format writing for the write command from the host computer 10.

Figure 27:
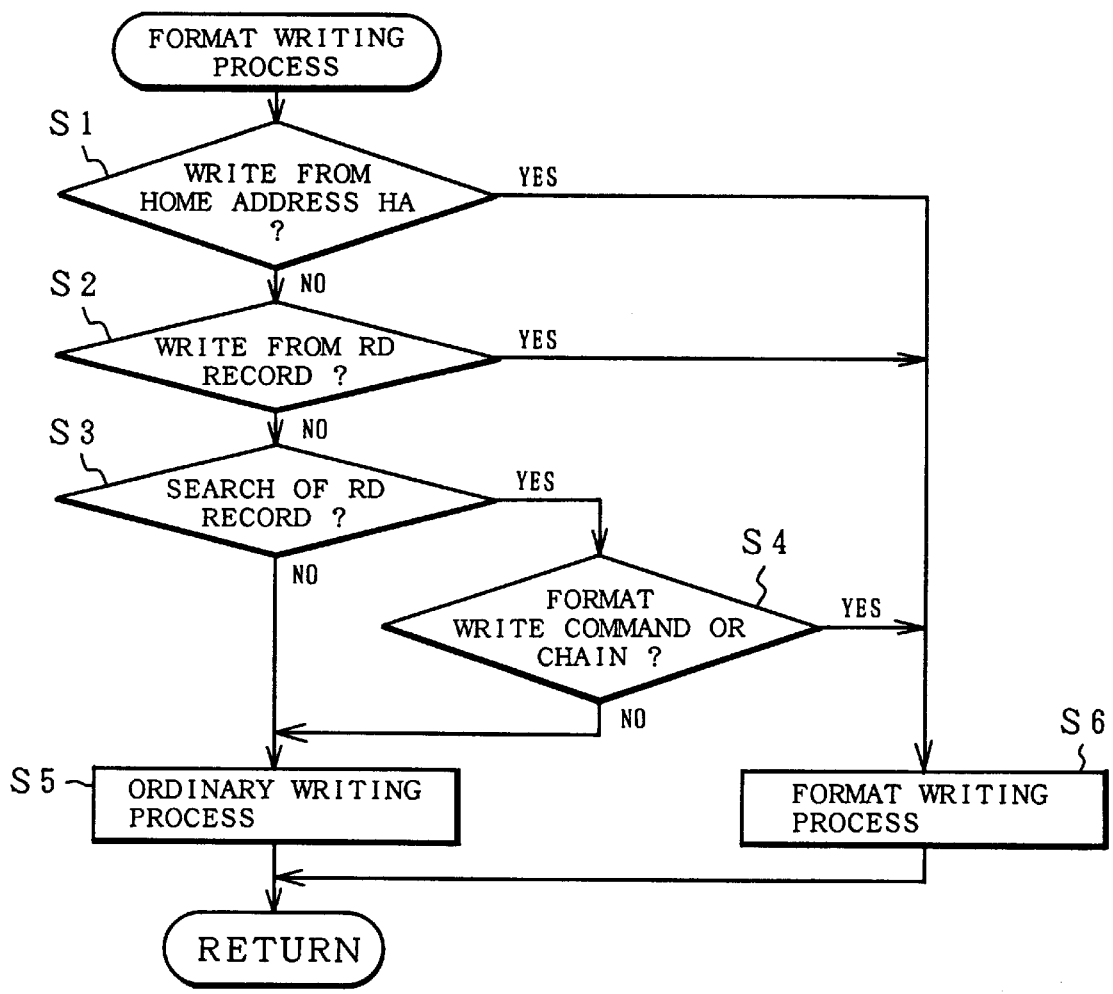
FIG. 27 is a flowchart for a format writing process.

Condition 1: Writing of the home address HA
Condition 2: Writing of the R0 record
Condition 3: Search of the R0 record and the format write command is chained FIG. 27 is a flowchart for a judging process of the format writing in the channel adapters 24-1 to 24-4 in FIG. 4. When a write command is received in association with the input/output request from the host computer 10, in step S1, as a condition 1, a check is made to see if the process is the writing from the home address HA of the CKD format in FIG. 5 or not. If YES, step S6 follows and the space area of the cache memory 32 is formatted to the standard CKD format. When the process is not the writing from the home address HA, the processing routine advances to step S2. A check is made as a condition 2 to see if the process is the writing from the R0 record or not. If YES, the processing routine advances to step S6 and the space area in the cache memory 32 is formatted to the standard CKD format. Further, when the process is not the writing from the R0 record, step S3 follows and a check is made as a condition 3 to see if the process is the search from the R0 record or not. If YES, step S4 follows and a check is made to see if the format write command of the CKD has been chained or not. If YES, step S6 follows and the space area in the cache memory 32 is formatted to the standard CKD format. When the process is not the search of the R0 record in step S3 or when the format write command is not chained in step S4, the processing routine advances to step S5. The ordinary writing operation in association with the judging process of the cache hit is executed.

Figure 28:
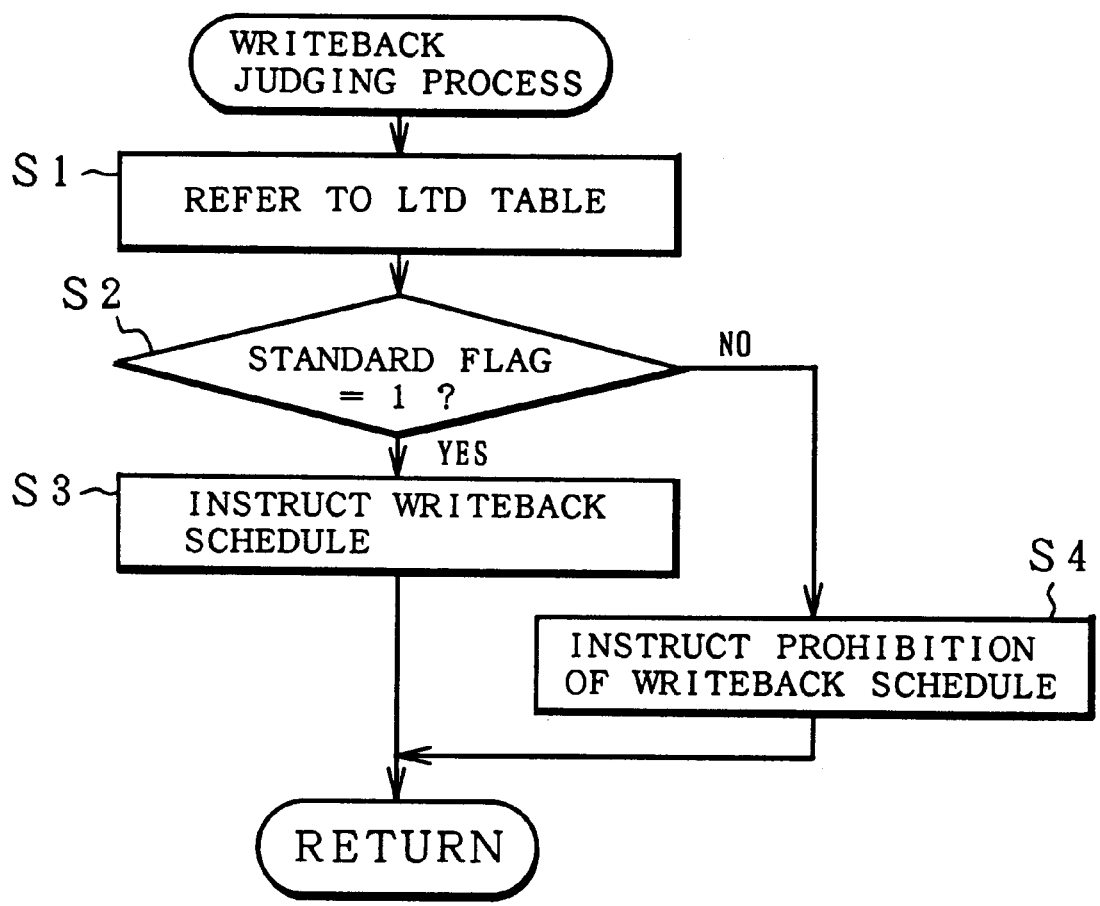
FIG. 28 is a flowchart for a write back judging process.

FIG. 28 is a flowchart for a judging process of a writeback schedule in the format writing process in FIG. 27. This process is executed on a track address unit basis. First in step S1, the standard flag 88 of the LTD 50 in FIG. 8 is referred. When the flag 88 is set to 1, the format is the standard CKD format. Therefore, step S3 follows and the writeback schedule is instructed to the device adapters 40-1 to 40-4. When the standard flag 88 is reset to 0, since the format is not the standard CKD format, step S4 follows and the inhibition of the writeback schedule is instructed to the device adapters 40-1 to 40-4.

As mentioned above, at the time of the format writing to the cache memory 32, the standard flag 88 of the LTD 50 is referred. A problem such that the track data of the standard CKD format on the cache memory is written back for the track data without the standard CKD format and a data destruction occurs in the disk unit can be prevented. A coherence between both of them can be certainly guaranteed.

Although the above embodiment has been described with respect to an example of the CKD format as a variable length record, the above problem also similarly occurs in case of an FBA format (Fixed Block Address Format) as a fixed length recording format.

The above point corresponds to the case of using the disk units of the FBA formats as disk units 18-1 to 18-6 in FIG. 4.

Figure 29A:
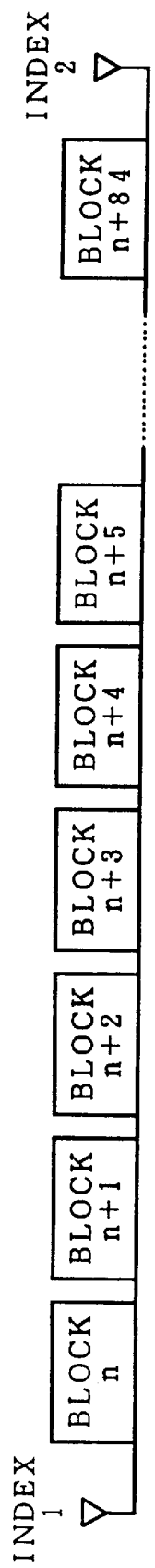
FIGS. 29A and 29B are explanatory diagrams of FBA formats.

FIG. 29A shows track data of an FBA standard format. One track between indices 1 and 2 is divided into 85 blocks of a fixed length on a 4-kbyte unit basis. The track of the FBA standard format is formatted to the fixed length blocks of, for example, an 8-kbyte length in the case where a medium defect or a defective reading occurs by the medium inspection upon formatting of the disk and the inspection is temporarily stopped or the like. In such a case, when the track format of the disk units 18-1 to 18-6 is the standard FBA format in which the fixed block length is equal to 4 kbytes, "1" is set into the standard flag 88 of the LTD 50 in FIG. 8. When it is not the standard FBA format, the standard flag 88 is reset to "0". A command decoding function of the format writing is provided for each of the channel adapters 24-1 to 24-4. Since the input/output command system of the host computer 10 is the CKD command system, the channel adapters 24-1 to 24-4 execute the format writing operation in the case where either one of the three conditions is discriminated in accordance with the flowchart of FIG. 27.

Figure 29B:
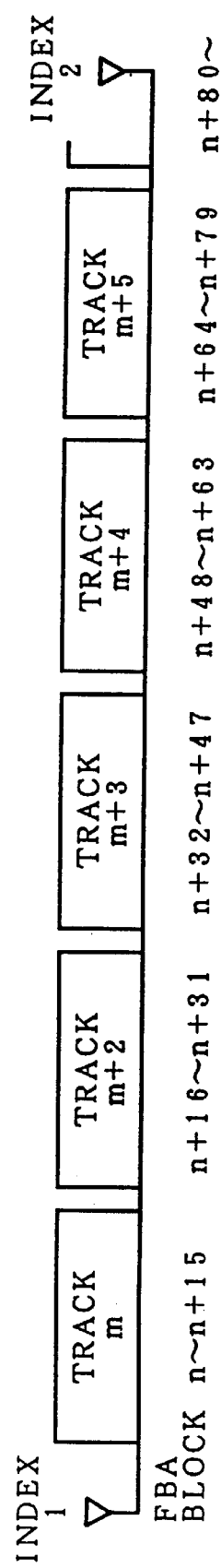

When the track data stored in the cache memory 32 by the standard CKD format is written back into the disk unit, an emulation to convert the CKD format into the FBA format is necessary for the device adapters 40-1 to 40-4. As such an emulation, it is sufficient that the track data of the CKD format in FIG. 5 is simply divided into the fixed-length blocks on a 4-kbyte unit basis in FIG. 29A, thereby converting into the FBA format. FIG. 29B shows an example of an emulation in the case where 16 blocks n to n+15, n+16 to n+31, . . . of the FBA format in FIG. 29A are converted to the tracks m, m+1, . . . of the CKD format. Namely, the track data corresponding to the 16-block length of the FBA format on the cache memory is divided into 16 blocks of the FBA format and written back into the disk units.

Another embodiment which needs the emulation for converting the CKD format to the FBA format relates to the case of a disk array of the RAID construction in the disk units 18-1 to 18-6. The disk units which are used in the disk array of the RAID construction ordinarily use the FBA format. Therefore, the cache memory 32 of the disk control unit also has the FBA format.

In this case, an emulating function for converting the track data from the standard CKD format into the standard FBA format is provided for each of the channel adapters 24-1 to 24-4. The emulating function is also effective in case of the format writing. That is, the track data of the CKD format from the host computer 10 is divided into the blocks of a fixed block length unit of 4 kbytes of the FBA format and written into the cache memory. Upon format writing, the channel adapters 24-1 to 24-4 refer to the standard flag 88 of the LTD 50. In case of the standard FBA format, a schedule to write back is instructed to the device adapters 40-1 to 40-4. In case of a format other than the standard FBA format, the inhibition of the writeback schedule is instructed.

According to the invention as mentioned above, in the cache control for the disk units having the recording format of the variable length as a target, the LTD in which the format information of the disk apparatus is stored on the disk control unit side is stored and is referred at the time of a mishit in association with the write request from the upper apparatus, thereby identifying the recording position of the track on the cache memory without actually referring to the recording format of the disk unit. All of the processes in association with the write request from the upper apparatus are executed on the cache memory and can be promptly finished. Even for the request of the recording format different from the recording format in the actual disk unit from the upper apparatus, the disk control unit can recognize a difference of the recording format by referring the recording format of the LTD. The input/output request based on the different recording format can be promptly refused without accessing the disk unit. Further, with regard to the staging from the disk unit in association with the read request of the upper apparatus, by referring to the LTD of the recording format, the staging of a plurality of tracks is recognized and a response by the parallel staging can be performed at a high speed.

The above embodiment has been described with respect to the access control using the disk cache for the disk units of the RAID construction as an example. However, the invention can be also similarly applied to a disk cache control for the disk units which can be accessed by a plurality of device buses and which have a construction other than the RAID construction. Further, the invention is not limited by the numerical values of the above embodiment.

What is claimed is:

1. A disk control unit for writing and reading data to/from at least one disk device on the basis of an input/output request of an upper apparatus, comprising:

a volatile cache memory for holding data of the disk device on a track unit basis;

a recording format information table for holding recording format information of tracks in the disk device;

a write cache control unit for controlling in a manner such that for a write request from the upper apparatus, in the case where corresponding track data exist on said cache memory, a writing process is finished on said cache memory, and in the case where corresponding track data do not exist on said cache memory, a recording format is analyzed with reference to said recording format information table, a recording position on a track to be developed into said cache memory is recognized, and writing process is finished on said cache memory;

a read cache control unit for controlling in a manner such that for a read request from the upper apparatus, in the case where corresponding track data exist on said cache memory, data on said cache memory is transferred to the upper apparatus and a reading process is finished, and in the case where corresponding track data do not exist on said cache memory, a corresponding track is staged from the disk device and data from said corresponding track is transferred to the upper apparatus, and said reading process is finished;

a table write back unit for writing contents in said recording format information table into a corresponding disk device at a time of shut-off of a power supply;

a career management table in which table valid information indicating said recording format information table is valid and table invalid information indicating said recording format information is invalid with respect to a device number of the at least one disk device which can be installed have been stored; and a table forming unit constructed in a manner such that at a time of turn-on of said power supply, said table forming unit refers to said career management table so that a storage area in said recording format information table of the disk device is assured in said cache memory, said career management table is also referred to in accordance with said device number of the at least one disk device, and when said table valid information is recognized, said recording format information of a corresponding disk device is read, and when said table invalid information is recognized, the reading of said recording format information of the corresponding disk device is inhibited.

2. A disk control unit according to claim 1, wherein:

the disk device has a track data format of a variable length;

said recording format information table has a data length of an R0 record in which upper control information on the track has ben stored as said recording format information; and when a processing request to change a recording format after an R1 record as a user area subsequent to said R0 record of the track data is received from the upper apparatus, said write cache control unit recognizes a start position of said R1 record from a data length of said R0 record in said recording format information table and changes the recording format on said cache memory.

3. A disk control unit according to claim 2, wherein:

said recording format information table holds a number of records existing on the track as recording format information; and for a write request by a designation of a record number from the upper apparatus, said write cache control unit refers to the number of records existing on the track of said recording format information table and judges whether the designated record exists on the track or not.

4. A disk control unit according to claim 2, wherein:

said recording format information table holds an equal length flag indicating that all of the records on the track have an equal data length as recording format information; and for a write request by the designation of a record number from the upper apparatus, said write cache control unit calculates a position of the designated record on said cache memory from said equal length flag and said record length and writes.

5. A disk control unit according to claim 1, wherein:

said disk device further has a defective alternating track correspondence table showing a correspondence between a defective track and an alternating track;

said recording format information table holds a defective track flag to recognize the defective track as recording format information; and in the case where said defective track flag is recognized for the write request from the upper apparatus, said write cache control unit refers to said defective alternating track correspondence table and writes the data from the upper apparatus into the alternating track on said cache memory.

6. A disk control unit according to claim 1, wherein said table writeback unit periodically writes back the contents in said recording format information table into the corresponding disk device.

7. A disk control unit according to claim 1, wherein:

when a recording format requested from the upper apparatus is changed on said cache memory, said write cache control unit updates the recording format information in said corresponding recording format information table; and at the end of a changing process of said recording format information by said write cache control unit, said table writeback unit writes back said recording format information into the corresponding disk device.

8. A disk control unit according to claim 7, wherein:

when the recording format is changed, said write cache control unit sets format change information into said career management table; and at the time of shut-off of the power supply, said table writeback unit refers to said career management table and writes back only the recording format information table having said format change information into corresponding disk device.

9. A disk control unit according to claim 1, wherein:

said recording format information table has flag information indicating whether said recording format information is a valid or an invalid recording format information; and said table forming unit forms the recording format information with respect to the track in which said flag information is invalid and stores the recording format information into said recording format information table.

10. A disk control unit according to claim 9, wherein when a format writing to initialize a recording format from the upper apparatus is executed and the records of one track are formed on said cache memory by said write cache control unit, said table forming unit forms and stores corresponding recording format information into the recording format information table.

11. A disk control unit according to claim 9, wherein said table forming unit periodically searches the track in which the flag information is invalid in said recording format information table, reads out the track data from said disk device, analyzes said track data, and forms the recording format information.

12. A disk control unit according to claim 9, wherein when the track data is staged from said disk device by said read cache control unit, in the case where it is recognized that the corresponding flag information in said recording format information table is invalid, said table forming unit analyzes said staged track data and forms the recording format information.

13. A disk control unit according to claim 1, wherein in the case where a disk device is newly extended and can be used, said table forming unit assures a memory area of the recording format information table of said extended disk device onto said cache memory and, at the same time, periodically reads out and analyzes all of the track data of said extended disk device, thereby forming and storing the recording format information into said recording format information table.

14. A disk control unit according to claim 1, wherein for the read request from the upper apparatus, in the case where the corresponding data does not exist on said cache memory, when a staging of a plurality of track data for said plurality of disk devices is recognized with reference to said recording format information table, said read cache control unit instructs parallel reading operations to said plurality of disk devices, thereby simultaneously staging a plurality of tracks.

15. A disk control unit according to claim 1, wherein:

the recording format information of said recording format information table indicates whether track data of disk device has a standard format written in said cache memory or not; and when an empty area in said cache memory is changed to the standard format by a format write command from the upper apparatus, said write cache control unit refers to said recording format information table and instructs a schedule to write back the track data into the disk in case of the standard format, and said write cache control unit instructs an inhibition of the schedule to write back the track data to the disk in case of a format other than the standard format.

16. A disk control unit according to claim 15, wherein said standard format is a CKD standard format of a variable length record and said write cache control unit executes a format writing when either one of the following conditions is discriminated by decoding a write command of the upper apparatus:

condition 1: writing of a home address HA condition 2: writing of an R0 record condition 3: search of the R0 record and the format write command is chained.

17. A disk control unit according to claim 15 wherein the upper apparatus has a command system of a CKD standard format of a variable length record, said cache memory and the at least one disk device have an FBA standard format of a fixed length record, and further in the case where the at least one disk device construct a disk array, said write cache control unit converts the track data of the CKD standard format from the upper apparatus into the FBA standard format of the fixed length record and executes a format writing by the standard FBA format to said cache memory when one of the following conditions is discriminated by decoding a write command before conversion:

condition 1: writing of a home address HA condition 2: writing of an R0 record condition 3: search of the R0 record and the format write command is chained.

* * * * *